US010975261B2

(12) United States Patent
Takayama et al.

(10) Patent No.: US 10,975,261 B2
(45) Date of Patent: Apr. 13, 2021

(54) AQUEOUS COATING COMPOSITION

(71) Applicant: KANSAI PAINT CO., LTD., Hyogo (JP)

(72) Inventors: Daisuke Takayama, Kanagawa (JP); Hironori Tonomura, Kanagawa (JP); Naoto Matsushima, Kanagawa (JP); Shuichi Nakahara, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 19 days.

(21) Appl. No.: 15/546,381

(22) PCT Filed: Dec. 10, 2015

(86) PCT No.: PCT/JP2015/084669
§ 371 (c)(1),
(2) Date: Jul. 26, 2017

(87) PCT Pub. No.: WO2016/121241
PCT Pub. Date: Aug. 4, 2016

(65) Prior Publication Data
US 2017/0369732 A1    Dec. 28, 2017

(30) Foreign Application Priority Data
Jan. 28, 2015  (JP) .............................. JP2015-014518

(51) Int. Cl.
| | | |
|---|---|---|
| *B05D 1/36* | (2006.01) | |
| *B05D 7/00* | (2006.01) | |
| *C09D 5/00* | (2006.01) | |
| *B05D 7/14* | (2006.01) | |
| *C09D 151/00* | (2006.01) | |
| *C09D 7/40* | (2018.01) | |
| *B05D 7/24* | (2006.01) | |
| *C09D 7/61* | (2018.01) | |
| *C09D 133/04* | (2006.01) | |
| *C08F 265/06* | (2006.01) | |
| *C09D 5/02* | (2006.01) | |
| *C09D 7/45* | (2018.01) | |
| *C08K 5/521* | (2006.01) | |

(52) U.S. Cl.
CPC .......... *C09D 151/003* (2013.01); *B05D 1/36* (2013.01); *B05D 7/24* (2013.01); *B05D 7/532* (2013.01); *C08F 265/06* (2013.01); *C09D 5/00* (2013.01); *C09D 5/02* (2013.01); *C09D 7/40* (2018.01); *C09D 7/45* (2018.01); *C09D 7/61* (2018.01); *C09D 133/04* (2013.01); *B05D 7/14* (2013.01); *B05D 2401/20* (2013.01); *C08K 5/521* (2013.01)

(58) Field of Classification Search
CPC ........ C09D 151/003; C09D 7/45; C09D 5/00; C09D 7/40; C09D 5/02; C09D 133/04; B05D 7/532; B05D 7/24; B05D 1/36
See application file for complete search history.

(56) References Cited

U.S. PATENT DOCUMENTS

| | | | | |
|---|---|---|---|---|
| 4,350,535 A * | 9/1982 | Ishijima | ............... | C09D 17/006 106/403 |
| 5,466,286 A * | 11/1995 | Briselli | .................... | C09D 5/38 106/403 |
| 6,348,528 B1 * | 2/2002 | Schlarb | ..................... | C08F 2/26 524/141 |
| 8,901,237 B2 * | 12/2014 | Chowdhry | ........... | C09D 133/12 524/556 |
| 8,906,507 B2 * | 12/2014 | Campbell | .............. | B05D 7/576 428/423.1 |
| 2002/0009550 A1 | 1/2002 | Yoshioka et al. | | |
| 2003/0175437 A1* | 9/2003 | Tsuda | .................... | B05D 3/107 427/385.5 |
| 2004/0096590 A1 | 5/2004 | Sasaki et al. | | |
| 2008/0199625 A1 | 8/2008 | Niwa | | |
| 2009/0306247 A1 | 12/2009 | Kawaguchi et al. | | |
| 2011/0111242 A1* | 5/2011 | Tomizaki | ................. | B05D 7/14 428/482 |

FOREIGN PATENT DOCUMENTS

| | | |
|---|---|---|
| CN | 1076374 | 12/2001 |
| GB | 2 453 473 | 4/2009 |

(Continued)

OTHER PUBLICATIONS

International Search Report dated Jan. 26, 2016 in International (PCT) Application No. PCT/JP2015/084669.
Extended European Search Report dated Jun. 6, 2018 in European Patent Application No. 15880133.2.
Notice of Reasons for Refusal dated Jul. 23, 2019 in corresponding JP Patent Application No. 2016-571802, with Machine English Translation.
Office Action dated Sep. 27, 2019, in corresponding Chinese Patent Application No. 201580074770.3, with English-language translation.

*Primary Examiner* — Francisco W Tschen
(74) *Attorney, Agent, or Firm* — Wenderoth, Lind & Ponack, L.L.P.

(57) ABSTRACT

The problem to be solved by the present invention is to provide an aqueous coating composition having an excellent finished appearance, such as smoothness and distinctness of image, as well as metallic feel and no metallic mottling when the composition comprises an effect pigment; excellent coating film performance, such as water resistance; and excellent storage stability. The present invention provides an aqueous coating composition comprising (A) acrylic resin particles, (B) a water-soluble acrylic resin, and (C) a phosphoric acid compound represented by a specific formula and having hydrocarbon (and optionally polyoxyalkylene); and also provides a method for forming a coating film, comprising applying the aqueous coating composition, as well as an article coated with the aqueous coating composition.

13 Claims, No Drawings

(56) References Cited

FOREIGN PATENT DOCUMENTS

| | | |
|---|---|---|
| JP | 2001-311035 | 11/2001 |
| JP | 2003-286450 | 10/2003 |
| JP | 2004-73956 | 3/2004 |
| JP | 2006-7006 | 1/2006 |
| JP | 2007-45948 | 2/2007 |
| JP | 2007-51254 | 3/2007 |
| JP | 2008-223013 | 9/2008 |
| JP | 2010-505969 | 2/2010 |
| JP | 2011-131135 | 7/2011 |
| WO | 95/33010 | 12/1995 |
| WO | 2008/044583 | 4/2008 |
| WO | 2011/009228 | 1/2011 |

* cited by examiner

AQUEOUS COATING COMPOSITION

TECHNICAL FIELD

Cross Reference of Related Application

This application claims priority to Japanese Patent Application No. 2015-014518, filed on Jan. 28, 2015, the disclosure of which is incorporated herein by reference in its entirety. The present invention relates to an aqueous coating composition for vehicles, comprising a phosphoric acid compound, the aqueous coating composition having excellent storage stability, an excellent finished appearance, and excellent coating film performance, such as water resistance.

BACKGROUND ART

On vehicle bodies, particularly exterior panels thereof, multilayer coating films each comprising an undercoating film with excellent anticorrosion properties, an intermediate coating film with excellent smoothness and chipping resistance, and a top coating film with an excellent appearance, are generally formed, in order to impart high anticorrosion properties and an excellent appearance.

Of these coating films, the top coating film can be formed by various methods usually using a colored coating composition, a colored base coating composition, a clear coating composition, etc. Examples of such methods include a 1-coat 1-bake process comprising applying a colored coating composition, followed by baking and curing; a 2-coat 1-bake process comprising applying a colored base coating composition containing an effect pigment, a color pigment, or like pigment, applying a clear coating composition over the uncured colored base coating film, and then simultaneously baking and curing the colored base coating film and the clear coating film; a 3-coat 1-bake process comprising applying a colored base coating composition containing a color pigment, applying an effect base coating composition containing an effect pigment with iridescence or the like over the uncured colored base coating film, applying a clear coating composition over the effect base coating film, and then simultaneously baking and curing the colored base coating film, the effect base coating film, and the clear coating film; and the like.

Generally, the 1-coat 1-bake process is often used for forming a coating film of a so-called solid color, such as white or black; the 2-coat 1-bake process is often used for forming a coating film of a so-called metallic color comprising an effect pigment, such as aluminum pigment; and the 3-coat 1-bake process is often used for forming a coating film of a so-called pearl color that presents iridescence.

Conventionally, as the colored coating composition, the colored base coating composition, and the effect base coating composition, organic solvent-type coating compositions are often used; however, large amounts of volatile organic compounds (VOCs) are produced due to the vaporization of the organic solvent during baking of the coated coating film. The use of aqueous coating compositions has recently been promoted, in terms of dealing with environmental pollution.

Top coating compositions applied to the exterior panels of vehicles have been further required in recent years to be capable of forming coating films with a high-grade design.

However, coating films obtained from the above aqueous coating compositions generally have inferior smoothness, distinctness of image, etc., as compared with organic solvent-type coating compositions.

Moreover, aqueous coating compositions containing an effect pigment have problems such that metallic feel, such as flip-flop property, is inferior, and metallic mottling is more likely to occur, as compared with organic solvent-type coating compositions.

To address these problems, PTL 1 discloses an aqueous coating composition comprising an aqueous resin dispersion and an effect material, the aqueous resin dispersion being obtained by solution-polymerizing a monomer mixture A having an acid value of 30 to 150 and a hydroxy value of 10 to 100 in water to obtain an aqueous solution resin for emulsion polymerization, and then emulsion-polymerizing a monomer mixture B having an acid value of up to 20 and a hydroxy value of up to 100 using the aqueous solution resin for emulsion polymerization as a protective colloid, thereby synthesizing a core resin in the protective colloid. The aqueous coating composition can form a coating film having an excellent appearance, particularly an excellent flip-flop property. However, the production of the aqueous resin dispersion requires a number of processes, resulting in a high production cost. Further, the coating film formed from this aqueous coating composition has inferior smoothness, and may have metallic mottling.

PTL 2 discloses a method for forming a composite coating film, comprising applying an aqueous base coating composition to a substrate, and applying a clear top coating composition thereon, wherein the aqueous base coating composition contains a polyether polyol having 0.02 or more primary hydroxyl groups per molecule on the average, a number average molecular weight of 300 to 3000, and a water tolerance of 2.0 or more; and an emulsion resin obtained by emulsion-polymerizing an α, β-ethylenically unsaturated monomer mixture containing 65 wt. % or more of (meth)acrylic acid ester in which the ester portion has 1 or 2 carbon atoms, and having an acid value of 3 to 50. According to this method for forming a coating film, a coating film particularly having an excellent flip-flop property can be formed. However, the coating film formed by this method has inferior smoothness, and may have metallic mottling.

PTL 3 discloses an aqueous coating composition comprising (A) a hydroxy-containing resin, (B) a curing agent, (C) a specific diester compound, and a pigment. This aqueous coating composition can form a coating film having an excellent appearance, particularly having an excellent flip-flop property and less metallic mottling. However, the coating film formed from this aqueous coating composition has inferior smoothness, and may have inferior water resistance.

PTL 4 discloses an aqueous metallic coating composition comprising a coating film-forming resin containing a specific acrylic resin emulsion, a specific hydrophobic melamine resin aqueous dispersion as a curing agent, an effect pigment, and a reactive thickener. This aqueous metallic coating composition can form a coating film particularly having an excellent flip-flop property. However, the coating film formed from this aqueous metallic coating composition has inferior smoothness, and may have inferior water resistance.

The 2-coat 1-bake process, in which the clear coating composition is applied while the base coating film is uncured, has problems such that the formation of a mixed layer easily occurs in the interface between the base coating film and the clear coating film, and such that the reduction of distinctness of image and/or metallic mottling are likely to occur.

As a method for preventing the formation of a mixed layer between the base coating film and the clear coating film in the 2-coat 1-bake process described above, PTL 5 discloses using an aqueous base containing a specific tertiary amine, thus providing a multilayer coating film with excellent gloss and water-resistant adhesion. However, the coating film formed by this method for forming a coating film may have metallic mottling.

CITATION LIST

Patent Literature

PTL 1: JP2003-286450A
PTL 2: JP2001-311035A
PTL 3: JP2008-223013A
PTL 4: JP2007-045948A
PTL 5: JP2004-073956A

SUMMARY OF INVENTION

Technical Problem

An object of the present invention is to provide an aqueous coating composition having an excellent finished appearance, such as smoothness and distinctness of image, as well as metallic feel and no metallic mottling when the composition comprises an effect pigment, excellent coating film performance, such as water resistance, and excellent storage stability.

Solution to Problem

The present inventors conducted extensive research to achieve the above object, and consequently found that the above object can be achieved by an aqueous coating composition comprising (A) acrylic resin particles, (B) a water-soluble acrylic resin, and (C) a phosphoric acid compound represented by a specific formula. Thus, the present invention has been completed.

Specifically, the present invention provides an aqueous coating composition for vehicles, comprising (A) acrylic resin particles, (B) a water-soluble acrylic resin, and (C) a phosphoric acid compound represented by Formula (1) below:

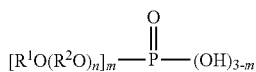
(1)

wherein m is 1 or 2, n is 0 or an integer of 1 to 20,
$R^1$ is substituted or unsubstituted hydrocarbon having 2 or more and 20 or less carbon atoms,
when m is 2, each $R^1$ may be the same or different,
$R^2$ is $C_{2-4}$ alkylene,
when n is 2 or more, n number of oxyalkylene units ($R^2O$) may be the same or different, and
when m is 2, each $(R^2O)_n$ may be the same or different.

The present invention also provides a method for forming a coating film, the method comprising applying the aqueous coating composition.

The present invention also provides an article coated with the aqueous coating composition.

Advantageous Effects of Invention

The aqueous coating composition for vehicles of the present invention comprises (A) acrylic resin particles, (B) a water-soluble acrylic resin, and (C) a phosphoric acid compound represented by a specific formula. In particular, the main characteristic is that the aqueous coating composition comprises (C) a phosphoric acid compound represented by a specific formula as a component that serves as a surfactant and a curing catalyst.

Such a phosphate compound as the component (C) is a compound having a phosphate group and a hydrocarbon group, and preferably further having a (poly)oxyalkylene group. Because of such a molecular structure, this compound has the action as an acid compound derived from the phosphate group, and also has the action as a surfactant due to the combined use of the phosphate group, which is a hydrophilic group (preferably a (poly)oxyalkylene group, which is a nonionic group), and the hydrocarbon group, which is a hydrophobic group.

Owing to the specific feature of the phosphoric acid compound (C), the aqueous coating composition of the present invention, which comprises the acrylic resin particles (A), the water-soluble acrylic resin (B), and the phosphoric acid compound (C) as constituents, exhibits wettability, viscosity development, and like effects, and thus has excellent storage stability and an excellent finished appearance (smoothness and distinctness of image). Furthermore, when the aqueous coating composition of the present invention is prepared as an effect base coating composition having a scale-like metallic powder pigment, such as aluminum pigment, storability can be improved due to the effect of preventing the reaction between the metal powder, such as aluminum, and water. Further, the orientation of the effect pigment in the coating film is excellent due to the surface-activating ability associated with wettability etc.; thus, there is an effect such that a coating film having excellent metallic feel and no metallic mottling can be obtained.

DESCRIPTION OF EMBODIMENTS

The aqueous coating composition for vehicles of the present invention is described in more detail below.

The aqueous coating composition for vehicles of the present invention (hereinafter also abbreviated as "the present coating composition") comprises (A) acrylic resin particles, (B) a water-soluble acrylic resin, and (C) a phosphoric acid compound represented by Formula (1) below:

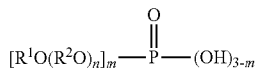
(1)

wherein m is 1 or 2, n is 0 or an integer of 1 to 20,
$R^1$ is substituted or unsubstituted hydrocarbon having 2 or more and 20 or less carbon atoms,
when m is 2, each $R^1$ may be the same or different,
$R^2$ is $C_{2-4}$ alkylene,
when n is 2 or more, n number of oxyalkylene units ($R^2O$) may be the same or different, and
when m is 2, each $(R^2O)_n$ may be the same or different.

Acrylic Resin Particles (A)

The acrylic resin particles (A) can be synthesized by a standard method, for example, by copolymerizing a polymerizable unsaturated monomer by emulsion polymerization in water, mini-emulsion polymerization in water, suspension polymerization, or the like.

Acrylic resin particles having a hydroxyl group as a crosslinking functional group can be preferably used, in terms of coating composition resin compositions (e.g., acrylic melamine resin, acrylic isocyanate resin, etc.) generally widely used as coating compositions for vehicles.

Examples of polymerizable unsaturated monomers include the following monomers (i) to (xx). These polymerizable unsaturated monomers can be used singly or in a combination of two or more.

(i) Compounds having one or more hydroxyl groups and one or more polymerizable unsaturated groups per molecule: for example, monoesterified products of (meth)acrylic acid with a dihydric alcohol having 2 to 8 carbon atoms (e.g., 2-hydroxyethyl (meth)acrylate, 2-hydroxypropyl (meth)acrylate, 3-hydroxypropyl (meth)acrylate, and 4-hydroxybutyl (meth)acrylate); ε-caprolactone modified products of such monoesterified products of (meth)acrylic acid with a dihydric alcohol having 2 to 8 carbon atoms; N-hydroxymethyl (meth)acrylamide; allyl alcohol; (meth)acrylates that include hydroxy-terminated polyoxyethylene chains; etc. (provided that, in the present invention, monomers corresponding to (xviii) polymerizable unsaturated monomers having a UV-absorbing functional group, described later, are excluded from the compounds having one or more hydroxyl groups and one or more polymerizable unsaturated groups per molecule specified in (i) above).

(ii) Alkyl or cycloalkyl (meth)acrylates: for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth) acrylate, nonyl (meth)acrylate, tridecyl (meth)acrylate, lauryl (meth)acrylate, stearyl (meth)acrylate, isostearyl (meth) acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate, etc.

(iii) Polymerizable unsaturated monomers having an isobornyl group: isobornyl (meth)acrylate, etc.

(iv) Polymerizable unsaturated monomers having an adamanthyl group: adamanthyl (meth)acrylate, etc.

(v) Polymerizable unsaturated monomers having a tricyclodecenyl group: tricyclodecenyl (meth)acrylate, etc.

(vi) Aromatic ring-containing polymerizable unsaturated monomers: benzyl (meth)acrylate, styrene, α-methylstyrene, vinyl toluene, etc.

(vii) Polymerizable unsaturated monomers having an alkoxysilyl group: vinyltrimethoxysilane, vinyltriethoxysilane, vinyltris(2-methoxyethoxy) silane, γ-(meth)acryloyloxypropyl trimethoxysilane, γ-(meth)acryloyloxypropyl triethoxysilane, etc.

(viii) Polymerizable unsaturated monomers having a fluorinated alkyl group: perfluoroalkyl (meth)acrylates, such as perfluorobutylethyl (meth)acrylate and perfluorooctylethyl (meth)acrylate; fluoroolefin; etc.

(ix) Polymerizable unsaturated monomers having a photopolymerizable functional group, such as a maleimide group.

(x) Vinyl compounds: N-vinyl pyrrolidone, ethylene, butadiene, chloroprene, vinyl propionate, vinyl acetate, etc.

(xi) Carboxy-containing polymerizable unsaturated monomers: (meth)acrylic acid, maleic acid, crotonic acid, β-carboxyethyl acrylate, etc.

(xii) Nitrogen-containing polymerizable unsaturated monomers: (meth)acrylonitrile, (meth)acrylamide, N,N-dimethylaminoethyl (meth)acrylate, N,N-diethylaminoethyl (meth) acrylate, N,N-dimethylaminopropyl (meth)acrylamide, methylenebis (meth)acrylamide, ethylenebis (meth)acrylamide, adducts of glycidyl (meth)acrylate with amine compounds, etc.

(xiii) Polymerizable unsaturated monomers having two or more polymerizable unsaturated groups per molecule: allyl (meth)acrylate, 1,6-hexanediol di(meth)acrylate, etc.

(xiv) Epoxy-containing polymerizable unsaturated monomers: glycidyl (meth)acrylate, β-methylglycidyl (meth) acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.

(xv) (Meth)acrylates having alkoxy-terminated polyoxyethylene chains.

(xvi) Sulfonic acid group-containing polymerizable unsaturated monomers: 2-acrylamide-2-methylpropanesulfonic acid, 2-sulfoethyl (meth)acrylate, allylsulfonic acid, and 4-styrenesulfonic acid; sodium salts and ammonium salts of such sulfonic acids; etc.

(xvii) Phosphate group-containing polymerizable unsaturated monomers: acid phosphoxyethyl (meth)acrylate, acid phosphoxypropyl (meth)acrylate, acid phosphoxypoly(oxyethylene) glycol (meth)acrylate, acid phosphoxypoly(oxypropylene) glycol (meth)acrylate, etc.

(xviii) Polymerizable unsaturated monomers having a UV-absorbing functional group: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole, etc.

(xix) UV-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth) acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.

(xx) Carbonyl-containing polymerizable unsaturated monomers: acrolein, diacetone acrylamide, diacetone methacrylamide, acetoacetoxyethyl methacrylate, formylstyrol, $C_4$-$C_7$ vinyl alkyl ketones (e.g., vinyl methyl ketone, vinyl ethyl ketone, and vinyl butyl ketone), etc.

In this specification, a polymerizable unsaturated group means an unsaturated group that can undergo radical polymerization. Examples of such polymerizable unsaturated groups include vinyl groups, (meth)acryloyl groups, and the like.

The term "(meth)acrylate" used herein means acrylate or methacrylate. The term "(meth)acrylic acid" means acrylic acid or methacrylic acid. The term "(meth)acryloyl" means acryloyl or methacryloyl. The term "(meth)acrylamide" means acrylamide or methacrylamide.

When the acrylic resin particles (A) have a hydroxyl group, the hydroxy value is preferably 1 to 200 mgKOH/g, more preferably 3 to 150 mgKOH/g, and even more preferably 5 to 100 mgKOH/g, in terms of the curability and water resistance of the resulting coating film, etc.

When the acrylic resin particles (A) have an acid group, the acid value is preferably 50 mgKOH/g or less, more preferably 0.1 to 30 mgKOH/g, and even more preferably 1 to 20 mgKOH/g, in terms of the storage stability of the coating composition, smoothness, distinctness of image, water resistance, etc.

The amount of the acrylic resin particles (A) is preferably 2 to 95 mass %, more preferably 10 to 75 mass %, and even more preferably 15 to 60 mass %, based on the total solids content of the acrylic resin (A) and the water-soluble acrylic resin (B).

The acrylic resin particles (A) preferably have a core/shell structure, in terms of viscosity development imparted to the coating composition, the water resistance of the resulting coating film, etc.

A suitable example of the core/shell type acrylic resin particles (A) is core/shell type hydroxy-containing acrylic resin particles (A1) having a core portion that is a copolymer (I) comprising, as copolymer components, a polymerizable unsaturated monomer having two or more polymerizable unsaturated groups per molecule and a polymerizable unsaturated monomer having one polymerizable unsaturated group per molecule, and a shell portion that is a copolymer (II) comprising, as copolymer components, a hydroxy-containing polymerizable unsaturated monomer, a carboxy-containing polymerizable unsaturated monomer, and other polymerizable unsaturated monomers.

Examples of the polymerizable unsaturated monomer having two or more polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-tris-hydroxymethylethane tri(meth) acrylate, 1,1,1-tris-hydroxymethylpropane tri(meth)acrylate, triallyl isocyanurate, diallyl terephthalate, divinylbenzene, methylenebis (meth)acrylamide, ethylenebis (meth) acrylamide, and the like. These monomers can be used singly or in a combination of two or more.

The polymerizable unsaturated monomer having two or more polymerizable unsaturated groups per molecule functions to provide a crosslinked structure to the core copolymer (I). The amount of the polymerizable unsaturated monomer having two or more polymerizable unsaturated groups per molecule can be suitably determined according to the degree of crosslinking of the core copolymer (I). The amount thereof is generally preferably about 0.1 to 30 mass %, more preferably about 0.5 to 10 mass %, and still more preferably about 1 to 7 mass %, based on the total mass of the monomers constituting the core copolymer (I).

Specific examples of the polymerizable unsaturated monomer having one polymerizable unsaturated group per molecule include, for example, among the polymerizable unsaturated monomers listed above, the monomers (i) to (xii), (xiv) to (xx), etc., which are polymerizable unsaturated monomers other than the polymerizable unsaturated monomers having two or more polymerizable unsaturated groups per molecule. These monomers can be used singly or in a combination of two or more according to the properties required of the core/shell type hydroxy-containing acrylic resin particles (A1).

Of these, in terms of the smoothness and distinctness of image of the resulting coating film, etc., it is preferable that at least one of the polymerizable unsaturated monomers having one polymerizable unsaturated group per molecule be a hydrophobic polymerizable unsaturated monomer.

In this specification, the hydrophobic polymerizable unsaturated monomer is a polymerizable unsaturated monomer having a linear, branched, or cyclic saturated or unsaturated hydrocarbon group having 4 or more carbon atoms, preferably 6 to 18 carbon atoms; and monomers having a hydrophilic group, such as hydroxy-containing polymerizable unsaturated monomers, are excluded therefrom. Examples of such monomers include alkyl or cycloalkyl (meth)acrylates, such as n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth) acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth) acrylate, cyclododecyl (meth)acrylate, and tricyclodecanyl (meth)acrylate; isobornyl-containing polymerizable unsaturated compounds, such as isobornyl (meth)acrylate; adamantyl-containing polymerizable unsaturated compounds, such as adamantyl (meth)acrylate; aromatic ring-containing polymerizable unsaturated monomers, such as benzyl (meth) acrylate, styrene, α-methylstyrene, and vinyl toluene; and the like. These monomers can be used singly or in a combination of two or more.

Of these, at least one polymerizable unsaturated monomer selected from the group consisting of n-butyl (meth)acrylate, 2-ethylhexyl (meth)acrylate, and styrene can be preferably used as the hydrophobic polymerizable unsaturated monomer, in terms of the distinctness of image etc. of the resulting coating film.

When a hydrophobic polymerizable unsaturated monomer mentioned above is used as a monomer for the core copolymer (I), the amount of the hydrophobic polymerizable unsaturated monomer is preferably 5 to 90 mass %, based on the total mass of the monomers constituting the core copolymer (I), in terms of the excellent stability of the core/shell type hydroxy-containing acrylic resin particles (A1) in an aqueous medium, the excellent smoothness and distinctness of image of the resulting coating film, etc.

The shell copolymer (II) comprises, as copolymer components, a hydroxy-containing polymerizable unsaturated monomer, an acid group-containing polymerizable unsaturated monomer, and other polymerizable unsaturated monomers.

The hydroxy-containing polymerizable unsaturated monomer used as a monomer for the shell copolymer (II) introduces, into the obtained core/shell type hydroxy-containing acrylic resin particles (A1), a hydroxyl group that can be crosslinked with crosslinking agents (e.g., melamine resin, polyisocyanate compound, etc.) for coating composition resin compositions (e.g., acrylic melamine resin, acrylic isocyanate resin, etc.) that are generally widely used as coating compositions for vehicles, and thereby functions to enhance the water resistance etc. of the coating film and to enhance the stability of the core/shell type hydroxy-containing acrylic resin particles (A1) in an aqueous medium.

Examples of the hydroxy-containing polymerizable unsaturated monomer include monoesterified products of (meth)acrylic acid with a dihydric alcohol having 2 to 8 carbon atoms (e.g., 2-hydroxyethyl (meth)acrylate, 2-hydroxypropyl (meth)acrylate, 3-hydroxypropyl (meth)acrylate, and 4-hydroxybutyl (meth)acrylate); ε-caprolactone modified products of such monoesterified products of (meth) acrylic acid with a dihydric alcohol having 2 to 8 carbon atoms; N-hydroxymethyl (meth)acrylamide; allyl alcohol; (meth)acrylates that include hydroxy-terminated polyoxyethylene chains; etc.

Such monomers can be used singly or in a combination of two or more. Preferable examples of the hydroxy-containing polymerizable unsaturated monomer include 2-hydroxyethyl (meth)acrylate, 2-hydroxypropyl (meth)acrylate, 3-hydroxypropyl (meth)acrylate, and 4-hydroxybutyl (meth)acrylate; among these, 2-hydroxyethyl (meth)acrylate can be particularly preferably used.

The amount of the hydroxy-containing polymerizable unsaturated monomer is preferably 1 to 40 mass %, more preferably 4 to 25 mass %, and even more preferably 7 to 19 mass %, based on the total mass of the monomers constituting the shell copolymer (II).

Specific examples of the carboxy-containing polymerizable unsaturated monomer used as a monomer for the shell copolymer (II) include the carboxy-containing polymerizable unsaturated monomers (xi) among the polymerizable unsaturated monomers listed above as examples of the polymerizable unsaturated monomer. Among these, it is preferable to use acrylic acid and/or methacrylic acid. The use of the carboxy-containing polymerizable unsaturated monomer in the shell portion can improve the stability of the resulting core/shell type hydroxy-containing acrylic resin particles (A1) in an aqueous medium.

The amount of the carboxy-containing polymerizable unsaturated monomer used is preferably 0.1 to 30 mass %, more preferably 2 to 25 mass %, and even more preferably 3 to 19 mass %, based on the total mass of the monomers constituting the shell copolymer (II), in terms of the excellent stability of the resulting core/shell type hydroxy-containing acrylic resin particles (A1) in an aqueous medium.

The other polymerizable unsaturated monomers used as monomers for the shell copolymer (II) are polymerizable unsaturated monomers other than the hydroxy-containing polymerizable unsaturated monomers and carboxy-containing polymerizable unsaturated monomers mentioned above. Examples of such monomers include alkyl or cycloalkyl (meth)acrylates, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, and tricyclodecanyl (meth)acrylate; isobornyl-containing polymerizable unsaturated compounds, such as isobornyl (meth)acrylate; adamantyl-containing polymerizable unsaturated compounds, such as adamantyl (meth)acrylate; and aromatic ring-containing polymerizable unsaturated monomers, such as benzyl (meth)acrylate, styrene, α-methylstyrene, and vinyl toluene; and the like. These monomers can be used singly or in a combination of two or more.

In terms of improving the finished appearance of the resulting coating film, it is preferable not to use polymerizable unsaturated monomers having two or more polymerizable unsaturated groups per molecule as the other polymerizable unsaturated monomers used as monomers for the shell copolymer (II), thus forming an uncrosslinked copolymer (II).

In terms of improving the distinctness of image and luster of the resulting coating film, the ratio of the copolymer (I) to the copolymer (II) in the core/shell type hydroxy-containing acrylic resin particles (A1) is preferably in the range of 5/95 to 95/5, more preferably 50/50 to 85/15, and even more preferably 60/40 to 80/20, on a solids basis.

In terms of the excellent curability of the coating composition, the excellent water resistance of the resulting coating film, etc., the hydroxy value of the core/shell type hydroxy-containing acrylic resin particles (A1) is preferably in the range of 1 to 200 mgKOH/g, more preferably 3 to 150 mgKOH/g, and even more preferably 5 to 100 mgKOH/g.

In terms of improving the storage stability of the coating composition, and the smoothness and distinctness of image of the resulting coating film, the acid value of the core/shell type hydroxy-containing acrylic resin particles (A1) is preferably in the range of 40 mgKOH/g or less, more preferably 0.1 to 30 mgKOH/g, and even more preferably 1 to 20 mgKOH/g.

The amount of the core/shell type hydroxy-containing acrylic resin particles (A1) in the aqueous coating composition of the present invention is preferably 2 to 95 mass %, more preferably 10 to 75 mass %, and even more preferably 15 to 60 mass %, based on the total solids content of the acrylic resin particles (A) and a water-soluble acrylic resin (B) described below.

The core/shell type hydroxy-containing acrylic resin particles (A1) can be synthesized, for example, by subjecting to emulsion polymerization a monomer mixture of 0.1 to 30 mass % of a polymerizable unsaturated monomer having two or more polymerizable unsaturated groups per molecule, and 70 to 99.9 mass % of a polymerizable unsaturated monomer having one polymerizable unsaturated group per molecule to form an emulsion of a core copolymer (I); adding to this emulsion a monomer mixture of 1 to 40 mass % of a hydroxy-containing polymerizable unsaturated monomer, 0.1 to 30 mass % of a carboxy-containing polymerizable unsaturated monomer, and 30 to 98.9 mass % of other polymerizable unsaturated monomers; and further performing emulsion polymerization to form a shell copolymer (II).

The emulsion polymerization for preparing an emulsion of the core copolymer (I) can be performed according to a known method. Specifically, the emulsion can be prepared by subjecting the monomer mixture to emulsion polymerization using a polymerization initiator in the presence of a surfactant.

For the surfactant, anionic surfactants and nonionic surfactants are suitable. Examples of anionic surfactants include sodium salts and ammonium salts of alkylsulfonic acids, alkylbenzenesulfonic acids, alkylphosphoric acids, etc. Examples of nonionic surfactants include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc.

Other examples of usable surfactants include polyoxyalkylene-containing anionic surfactants that have an anionic group and a polyoxyalkylene group, such as polyoxyethylene or polyoxypropylene, per molecule; and reactive anionic surfactants that have an anionic group and a radically polymerizable unsaturated group per molecule. Among these, reactive anionic surfactants are preferable.

Examples of reactive anionic surfactants include sodium salts of sulfonic acid compounds having a radically polymerizable unsaturated group, such as allyl, methallyl, (meth)acryloyl, propenyl, or butenyl; ammonium salts of such sulfonic acid compounds; and the like. Among these, ammonium salts of sulfonic acid compounds having a radically polymerizable unsaturated group are preferable in terms of the excellent water resistance of the resulting coating film. Examples of commercially available ammonium salts of such sulfonic acid compounds include "LATEMUL S-180A" (trade name, produced by Kao Corporation).

Among the above ammonium salts of sulfonic acid compounds having a radically polymerizable unsaturated group, ammonium salts of sulfonic acid compounds having a radically polymerizable unsaturated group and a polyoxyalkylene group are more preferable. Commercially available ammonium salts of sulfonic acid compounds having a radically polymerizable unsaturated group and a polyoxyalkylene group include "Aqualon KH-10" (trade name, produced by Dai-Ichi Kogyo Seiyaku Co., Ltd.), "LATEMUL PD-104" (trade name, produced by Kao Corporation), "Adeka Reasoap SR-1025" (trade name, produced by ADEKA Co., Ltd.), etc.

The amount of the surfactant used is preferably in the range of 0.1 to 15 mass %, more preferably 0.5 to 10 mass %, and even more preferably 1 to 5 mass %, based on the total amount of all of the monomers used.

Examples of polymerization initiators include organic peroxides, such as benzoyl peroxide, octanoyl peroxide, lauroyl peroxide, stearoyl peroxide, cumene hydroperoxide, tert-butyl peroxide, di-tert-amyl peroxide, tert-butyl peroxy-2-ethylhexanoate, tert-butyl peroxylaurate, tert-butyl peroxyisopropylcarbonate, tert-butylperoxyacetate, and diisopropylbenzene hydroperoxide; azo compounds, such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], and azobis{2-methyl-N-[2-(1-hydroxybutyl)]-propionamide}; persulfates, such as potassium persulfate, ammonium persulfate, and sodium persulfate; and the like. These polymerization initiators can be used singly or in a combination of two or more.

Redox initiators prepared by combining a polymerization initiator mentioned above with a reducing agent, such as sugar, sodium formaldehyde sulfoxylate, iron complex, etc., may also be used.

The amount of the polymerization initiator used is generally preferably in the range of 0.1 to 5 mass %, and more preferably 0.2 to 3 mass %, based on the total mass of all of the monomers used. The method of adding the polymerization initiator is not particularly limited, and can be suitably selected according to the type, amount, etc., of polymerization initiator. For example, the polymerization initiator may be incorporated into a monomer mixture or an aqueous medium beforehand, or may be added all at once or dropwise at the time of polymerization.

The core/shell type hydroxy-containing acrylic resin particles (A1) can be obtained by adding a monomer mixture of a hydroxy-containing polymerizable unsaturated monomer, a carboxy-containing polymerizable unsaturated monomer, and other polymerizable unsaturated monomers to the emulsion of the core copolymer (I) obtained above; and further performing polymerization to form a shell copolymer (II).

The monomer mixture for forming the shell copolymer (II) may optionally contain other components, such as a polymerization initiator mentioned above, a chain transfer agent, a reducing agent, and a surfactant. The monomer mixture is preferably added dropwise as a monomer emulsion obtained by dispersing the monomer mixture into an aqueous medium, although it may be added dropwise as is.

The polymerization of the monomer mixture for forming the shell copolymer (II) is performed, for example, by adding the monomer mixture or emulsion thereof to the emulsion of the core copolymer (I) all at once or dropwise within a predetermined time, and heating the mixture to a suitable temperature while stirring. The core/shell type hydroxy-containing acrylic resin particles (A1) thus obtained have a core/shell structure comprising a core copolymer (I) of a monomer mixture of a polymerizable unsaturated monomer having two or more polymerizable unsaturated groups per molecule and a polymerizable unsaturated monomer having one polymerizable unsaturated group per molecule, and a shell copolymer (II) of a monomer mixture of a hydroxy-containing polymerizable unsaturated monomer, a carboxy-containing polymerizable unsaturated monomer, and other polymerizable unsaturated monomers.

Moreover, the core/shell type hydroxy-containing acrylic resin particles (A1) may be a hydroxy-containing acrylic resin having three or more layers obtained by adding, between the step of obtaining the core copolymer (I) and the step of obtaining the shell copolymer (II), a step of supplying one or a mixture of two or more polymerizable unsaturated monomers that form one or more other resin layers, and performing emulsion polymerization.

In the present invention, the "shell portion" of the core/shell type hydroxy-containing acrylic resin particles (A1) refers to a polymeric layer present as the outermost layer of the resin particles, the "core portion" refers to a polymeric layer inside the resin particles other than the shell portion, and the "core/shell type structure" means a structure having the core portion and the shell portion.

The core/shell structure is generally a layered structure in which the core portion is completely covered by the shell portion. However, depending on the mass ratio of the core portion to the shell portion, etc., the monomer amount in the shell portion may be insufficient for forming a layered structure. In that case, a complete layered structure as described above is not necessary. A structure in which the shell portion partially covers the core portion may be selected. The concept of the multilayer structure in the above core/shell type structure also applies to a case in which the core portion of the core/shell type hydroxy-containing acrylic resin particles (A1) has a multilayer structure.

The acrylic resin particles (A) generally have an average particle size of 10 to 1,000 nm, preferably 20 to 500 nm, and more preferably 50 to 300 nm, in terms of the stability of the coating composition, and the smoothness and distinctness of image of the resulting coating film.

In this specification, the average particle size of the resin particles refers to a value obtained by measurement at 20° C. using a submicron particle size distribution analyzer after dilution with deionized water according to a usual method. For example, a "COULTER N4" (trade name, produced by Beckman Coulter, Inc.) may be used as the submicron particle size distribution analyzer.

The solids concentration of the acrylic resin particles (A) in a water dispersion is preferably 20 to 50 mass %, and more preferably 30 to 40 mass %. If the solids concentration exceeds 50 mass %, emulsification is difficult, and a water dispersion may be difficult to obtain. If the solids concentration is less than 20 mass %, the concentration is low, and thus the solvent (mainly water) components increase. Accordingly, for example, it may be difficult to use the acrylic resin particles (A) as a constituent of the aqueous coating composition.

To improve the mechanical stability of the acrylic resin particles (A), acid groups such as carboxyl groups of the water-dispersible acrylic resin are preferably neutralized with a neutralizing agent.

The neutralizing agent is not particularly limited, as long as it can neutralize acid groups. Examples of such neutralizing agents include basic compounds, such as sodium hydroxide, potassium hydroxide, trimethylamine, 2-(dimethylamino)ethanol, 2-amino-2-methyl-1-propanol, triethylamine, aqueous ammonia, etc.

Such a neutralizing agent is preferably used in an amount such that the pH of the water dispersion of the acrylic resin particles (A) after neutralization is 6.5 to 9.0.

Water-Soluble Acrylic Resin (B)

Different from the acrylic resin particles (A), which are synthesized in the form of particles in a dispersion medium, such as water, the water-soluble acrylic resin (B) is an acrylic resin that can take an aqueous form by being dissolved and dispersed in water by a water-dispersible group, such as a hydrophilic group.

Therefore, the water-soluble acrylic resin (B) generally has a water-dispersible group, such as an acid group.

The water-soluble acrylic resin (B) can be synthesized by, for example, copolymerizing a water-dispersible group-containing polymerizable unsaturated monomer and another polymerizable unsaturated monomer that is copolymerizable with the water dispersibility group-containing polymerizable unsaturated monomer by a general method, such as solution polymerization in an organic solvent.

As the polymerizable unsaturated monomer, for example, the following monomers (i) to (xx) can be used, as with the acrylic resin particles (A). These polymerizable unsaturated monomers can be used singly or in a combination of two or more.

(i) Compounds having one or more hydroxyl groups and one or more polymerizable unsaturated groups per molecule: for example, monoesterified products of (meth)acrylic acid with a dihydric alcohol having 2 to 8 carbon atoms (e.g., 2-hydroxyethyl (meth)acrylate, 2-hydroxypropyl (meth)acrylate, 3-hydroxypropyl (meth)acrylate, and 4-hydroxybutyl (meth) acrylate); ε-caprolactone modified products of such monoesterified products of (meth)acrylic acid with a dihydric alcohol having 2 to 8 carbon atoms; N-hydroxymethyl (meth) acrylamide; allyl alcohol; (meth)acrylates that include hydroxy-terminated polyoxyethylene chains; etc. (provided that, in the present invention, monomers corresponding to (xviii) polymerizable unsaturated monomers having a UV-absorbing functional group, described later, are excluded from the compounds having one or more hydroxyl groups and one or more polymerizable unsaturated groups per molecule specified in (i) above).

(ii) Alkyl or cycloalkyl (meth)acrylates: for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth) acrylate, nonyl (meth)acrylate, tridecyl (meth)acrylate, lauryl (meth)acrylate, stearyl (meth)acrylate, isostearyl (meth) acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate, etc.

(iii) Polymerizable unsaturated monomers having an isobornyl group: isobornyl (meth)acrylate, etc.

(iv) Polymerizable unsaturated monomers having an adamanthyl group: adamanthyl (meth)acrylate, etc.

(v) Polymerizable unsaturated monomers having a tricyclodecenyl group: tricyclodecenyl (meth)acrylate, etc.

(vi) Aromatic ring-containing polymerizable unsaturated monomers: benzyl (meth)acrylate, styrene, α-methylstyrene, vinyl toluene, etc.

(vii) Polymerizable unsaturated monomers having an alkoxysilyl group: vinyltrimethoxysilane, vinyltriethoxysilane, vinyltris(2-methoxyethoxy) silane, γ-(meth)acryloyloxypropyl trimethoxysilane, γ-(meth)acryloyloxypropyl triethoxysilane, etc.

(viii) Polymerizable unsaturated monomers having a fluorinated alkyl group: perfluoroalkyl (meth)acrylates, such as perfluorobutylethyl (meth)acrylate and perfluorooctylethyl (meth)acrylate; fluoroolefin; etc.

(ix) Polymerizable unsaturated monomers having a photopolymerizable functional group, such as a maleimide group.

(x) Vinyl compounds: N-vinyl pyrrolidone, ethylene, butadiene, chloroprene, vinyl propionate, vinyl acetate, etc.

(xi) Carboxy-containing polymerizable unsaturated monomers: (meth)acrylic acid, maleic acid, crotonic acid, R-carboxyethyl acrylate, etc.

(xii) Nitrogen-containing polymerizable unsaturated monomers: (meth)acrylonitrile, (meth)acrylamide, N,N-dimethylaminoethyl (meth)acrylate, N,N-diethylaminoethyl (meth) acrylate, N,N-dimethylaminopropyl (meth)acrylamide, methylenebis (meth)acrylamide, ethylenebis (meth)acrylamide, adducts of glycidyl (meth)acrylate with amine compounds, etc.

(xiii) Polymerizable unsaturated monomers having two or more polymerizable unsaturated groups per molecule: allyl (meth)acrylate, 1,6-hexanediol di(meth)acrylate, etc.

(xiv) Epoxy-containing polymerizable unsaturated monomers: glycidyl (meth)acrylate, β-methylglycidyl (meth) acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.

(xv) (Meth)acrylates having alkoxy-terminated polyoxyethylene chains.

(xvi) Sulfonic acid group-containing polymerizable unsaturated monomers: 2-acrylamide-2-methylpropanesulfonic acid, 2-sulfoethyl (meth)acrylate, allylsulfonic acid, and 4-styrenesulfonic acid; sodium salts and ammonium salts of such sulfonic acids; etc.

(xvii) Phosphate group-containing polymerizable unsaturated monomers: acid phosphoxyethyl (meth)acrylate, acid phosphoxypropyl (meth)acrylate, acid phosphoxypoly(oxyethylene) glycol (meth)acrylate, acid phosphoxypoly(oxypropylene) glycol (meth)acrylate, etc.

(xviii) Polymerizable unsaturated monomers having a UV-absorbing functional group: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole, etc.

(xix) UV-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth) acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.

(xx) Carbonyl-containing polymerizable unsaturated monomers: acrolein, diacetone acrylamide, diacetone methacrylamide, acetoacetoxyethyl methacrylate, formylstyrol, $C_4$-$C_7$ vinyl alkyl ketones (e.g., vinyl methyl ketone, vinyl ethyl ketone, and vinyl butyl ketone), etc.

Among the above monomers (i) to (xx), the (meth) acrylates that include hydroxy-terminated polyoxyethylene chains among the monomers (i), and the monomers (xi), (xvi), and (xvii) are water-dispersible group-containing polymerizable unsaturated monomers.

Of these, the carboxy-containing polymerizable unsaturated monomers (xi) are preferably used as the water-dispersible group-containing polymerizable unsaturated monomer, in terms of water dispersibility.

The synthesis of the water-soluble acrylic resin (B) is not particularly limited. For example, the synthesis can be carried out by adding dropwise a monomer mixture while heating in the presence of an organic solvent, and performing polymerization.

The reaction temperature during polymerization is generally about 60 to about 200° C., and preferably about 70 to about 160° C. The reaction time is generally about 10 hours or less, and preferably about 0.5 to about 6 hours.

Examples of the polymerization initiator used in the above reaction include organic peroxides, such as benzoyl peroxide, octanoyl peroxide, lauroyl peroxide, stearoyl peroxide, cumene hydroperoxide, tert-butyl peroxide, di-tert-amyl peroxide, t-butyl peroxy-2-ethylhexanoate, tert-butyl peroxylaurate, tert-butyl peroxyisopropylcarbonate, tert-butylperoxyacetate, and diisopropylbenzene hydroperoxide; azo compounds, such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], and azobis{2-methyl-N-[2-(l-hydroxybutyl)]-propionamide}; persulfates, such as potassium persulfate, ammonium persulfate, and sodium persulfate; and the like. These polymerization initiators can be used singly or in a combination of two or more.

The amount of the polymerization initiator used is generally 0.01 to 20 mass %, preferably 0.1 to 15 mass %, and more preferably 0.3 to 10 mass %, based on the total amount the polymerizable unsaturated monomers, in terms of polymerization reactivity, etc.

The synthesis of the water-soluble acrylic resin (B) is preferably performed in the presence of an organic solvent, in terms of production. The organic solvent can be suitably selected in consideration of the polymerization temperature, and the solubility, dispersibility, etc., of the acrylic resin in water.

Preferred organic solvents include alcohol solvents, cellosolve solvents, carbitol solvents, and the like. Specific examples include alcohol solvents, such as n-butanol; cellosolve solvents, such as ethylene glycol monobutyl ether, ethylene glycol monoisopropyl ether, ethylene glycol monomethyl ether, propylene glycol monomethyl ether, propylene glycol monopropyl ether, propylene glycol mono-n-butyl ether, dipropylene glycol monomethyl ether, and dipropylene glycol mono-n-butyl ether; carbitol solvents, such as diethylene glycol monobutyl ether, diethylene glycol monoethyl ether, and diethylene glycol monoethyl ether acetate; and the like.

Further, as the organic solvent, organic solvents immiscible with water, other than the above, can also be used within a range that does not interfere with the solubility and dispersibility of the acrylic resin (B) in water. Examples of such organic solvents include aromatic hydrocarbon solvents, such as toluene and xylene; ester solvents, such as ethyl acetate and butyl acetate; ketone solvents, such as methyl ethyl ketone and cyclohexanone; and the like.

The water-soluble acrylic resin (B) preferably has a weight average molecular weight of 2000 or more, more preferably 3000 to 50000, and even more preferably 5000 to 30000, in terms of the water dispersibility of the resin, the finished appearance and water resistance of the resulting coating film, etc.

In the present specification, the weight average molecular weight of the resin refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names; all produced by Tosoh Corporation), under the following conditions: mobile phase: tetrahydrofuran, measuring temperature: 40° C., flow rate: 1 cc/min, and detector: RI.

The water-soluble acrylic resin (B) preferably has an acid value of 100 mgKOH/g or less, more preferably 0.5 to 60 mgKOH/g, and even more preferably 1 to 40 mgKOH/g, in terms of the storage stability of the coating composition, the distinctness of image and water resistance of the resulting coating film, etc.

The water-soluble acrylic resin (B) preferably has a hydroxyl group as a crosslinking functional group, as with the acrylic resin particles (A), in terms of coating composition resin compositions (e.g., acrylic melamine resin, acrylic isocyanate resin, etc.) generally widely used as coating compositions for vehicles. When the water-soluble acrylic resin (B) has a hydroxyl group, the ratio of the hydroxy-containing polymerizable unsaturated monomer (monomer (i)) used is preferably 0.5 to 50 mass %, more preferably 1.0 to 40 mass %, and even more preferably 1.5 to 30 mass %, based on the total amount of the monomer components.

When the water-soluble acrylic resin (B) has a hydroxyl group, the hydroxy value is preferably 1 to 200 mgKOH/g, more preferably 2 to 180 mgKOH/g, and even more preferably 5 to 170 mgKOH/g, in terms of the curability and water resistance of the resulting coating film, etc.

When the water-soluble acrylic resin (B) is dispersed in water, in order to facilitate dissolution and dispersion in water, it is preferable to perform neutralization using a neutralizing agent, in terms of improving water dispersibility.

Examples of neutralizing agents include hydroxides of alkali metals or alkaline earth metals, such as sodium hydroxide, potassium hydroxide, lithium hydroxide, calcium hydroxide, and barium hydroxide; ammonia; primary monoamine compounds, such as ethylamine, propylamine, butylamine, cyclohexylamine, monoethanolamine, isopropanolamine, neopentanolamine, 2-aminopropanol, 3-aminopropanol, and 2-amino-2-methylpropanol; secondary monoamine compounds, such as diethylamine, dibutylamine, diethanolamine, dipropylamine, diisopropanolamine, N-methylethanolamine, N-ethylethanolamine, and N-methylisopropanolamine; tertiary monoamine compounds, such as triethylamine, tributylamine, dimethylethanolamine, diethylethanolamine, methyldiethanolamine, dimethylaminoethanol, and triethanolamine; polyamine compounds, such as ethylenediamine, diethylenetriamine, hydroxyethylaminoethylamine, ethylaminoethylamine, and methylaminopropylamine; pyridine; morpholine; and the like.

Of these, it is preferable to use primary monoamine compounds, secondary monoamine compounds, tertiary monoamine compounds, and polyamine compounds.

The amount of the water-soluble acrylic resin (B) is preferably 2 to 95 mass %, more preferably 10 to 75 mass %, and even more preferably 15 to 60 mass %, based on the total solids content of the acrylic resin particles (A) and the water-soluble acrylic resin (B).

In the aqueous coating composition of the present invention, resins other than the above acrylic resin particles (A) and the water-soluble acrylic resin (B) may also be used, if necessary.

Specific examples of such other resins include acrylic resins (except for the components (A) and (B)), polyester resins, urethane-modified polyester resins, epoxy resins, polyurethane resins, and the like.

It is preferable that such optionally usable resins other than the components (A) and (B) have a hydroxyl group as a crosslinking functional group, in terms of coating composition resin compositions (e.g., acrylic melamine resin, acrylic isocyanate resin, etc.) generally widely used as coating compositions for vehicles.

Among the above resins, acrylic resins (except for the components (A) and (B)) and polyester resins can be particularly preferably used.

Polyester Resin

Such a polyester resin can be synthesized by esterification reaction of a polybasic acid and a polyhydric alcohol by a known method in a standard manner. Moreover, in terms of water dispersibility, the polyester resin is preferably one having an acid group, such as a carboxyl group.

Polybasic acids are compounds having two or more carboxyl groups per molecule. Examples include phthalic acid, isophthalic acid, terephthalic acid, succinic acid, adipic acid, azelaic acid, sebacic acid, naphthalene dicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methyl hexahydrophthalic acid, and anhydrides thereof; and the like.

Polyhydric alcohols are compounds having two or more hydroxyl groups per molecule. Examples include glycol compounds, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, and neopentyl glycol hydroxypivalate; polylactone diols obtained by adding lactone compounds, such as ε-caprolactone, to such glycol compounds; polyester diol compounds, such as bis(hydroxyethyl)terephthalate; 1,3-cyclohexanedimethanol, 1,4-cyclohexanedimethanol, tricyclodecanedimethanol, hydrogenated bisphenol A, hydrogenated bisphenol F, spiroglycol, dihydroxymethyltricyclodecane, glycerol, trimethylolpropane, trimethylolethane, diglycerol, triglycerol, 1,2,6-hexanetriol, pentaerythritol, dipentaerythritol, dipentaerythritol, sorbitol, mannitol; hydroxycarboxylic acids, such as 2,2-dimethylpropionic acid, 2,2-dimethylolbutanoic acid, 2,2-dimethylolpentanoic acid, 2,2-dimethylolhexanoic acid, and 2,2-dimethyloloctanoic acid; and the like.

Also usable as the polyester resin are fatty acid-modified polyester resins that are modified with fatty acids of (semi-)drying oils, such as linseed oil fatty acid, coconut oil fatty acid, safflower oil fatty acid, soybean oil fatty acid, sesame oil fatty acid, perilla oil fatty acid, hemp oil fatty acid, tall oil fatty acid, dehydrated castor oil fatty acid, etc. It is usually suitable that the proportion of such modifying fatty acid be not more than 30 wt. % as an oil length. Moreover, the polyester resin may be obtained by reacting some monobasic acids, such as benzoic acid.

Further usable as the polyester resin are those obtained by reacting monoepoxy compounds, such as α-olefin epoxides (e.g., propylene oxide and butylene oxide) and Cardura E10 (trade name, produced by Hexion Specialty Chemicals; glycidyl ester of a synthetic highly branched saturated fatty acid), etc., with the acid group of the polyester resin.

When a carboxyl group is introduced into the polyester resin, the introduction can be carried out by, for example, adding an acid anhydride to hydroxy-containing polyester, followed by half-esterification.

When the polyester resin has a hydroxyl group, the hydroxy value is preferably 10 to 250 mgKOH/g, and particularly preferably 40 to 170 mgKOH/g, in terms of the water resistance and curability of the coating film.

When the polyester resin has an acid group, the acid value is preferably 5 to 100 mgKOH/g, and particularly preferably 10 to 60 mgKOH/g, in terms of the water resistance and adhesion of the coating film.

The number average molecular weight of the polyester resin is preferably 1000 to 100000, and more particularly preferably 1000 to 50000, in terms of the water resistance and curability of the coating film.

When the polyester resin has an acid group and is dispersible in water, in order to facilitate mixing and dispersion in water, it is preferable to perform neutralization using a neutralizing agent, as with the water-soluble acrylic resin (B), in terms of improving water dispersibility.

Usable neutralizing agents are the same as those exemplified for the component (B).

Phosphoric Acid Compound (C)

The phosphoric acid compound (C) is represented by Formula (1) below:

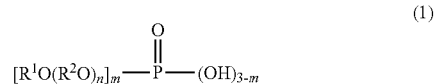

(1)

wherein m is 1 or 2, n is 0 or an integer of 1 to 20, $R^1$ is substituted or unsubstituted hydrocarbon having 2 or more and 20 or less carbon atoms, when m is 2, each $R^1$ may be the same or different, $R^2$ is $C_{2-4}$ alkylene, when n is 2 or more, n number of oxyalkylene units ($R^2O$) may be the same or different, wherein when they are different, the addition of $(R^2O)_n$ may be random-addition, block-addition, or alternate addition, and when m is 2, each $(R^2O)_n$ may be the same or different.

The phosphoric acid compound (C) may also be a neutralization salt.

The phosphoric acid compound (C) having the structure of the above Formula (1) has a phosphate group and a hydrocarbon group, and preferably further has a (poly)

oxyalkylene group. This compound has the action as an acid compound derived from the phosphate group, and also has the action as a surfactant due to the combined use of the phosphate group, which is a hydrophilic group (preferably a (poly)oxyalkylene group, which is a nonionic group) and the hydrocarbon group, which is a hydrophobic group.

Due to the characteristics as a surfactant, the phosphoric acid compound (C) has excellent emulsifiability for the acrylic resin particles (A) and water-soluble acrylic resin (B) of the aqueous coating composition of the present invention.

This results in wettability, viscosity development, and like effects; thus, the aqueous coating composition of the present invention has excellent storage stability and an excellent finished appearance (smoothness and distinctness of image).

Further, the phosphate group has the effect of preventing the reaction between a metal powder, such as aluminum, and water; therefore, in the case of an effect base coating composition having a scale-like metal powder pigment, such as aluminum pigment, storage stability can be improved, and the surface-activating ability makes the orientation of the effect pigment excellent in the coating film. Accordingly, a coating film having an excellent finished appearance with good metallic feel and no metallic mottling can be obtained.

Moreover, in the case of an aqueous coating composition in which the acrylic resin particles (A) and the water-soluble acrylic resin (B) have a hydroxyl group as a crosslinking functional group, and the composition comprises a crosslinking agent, such as melamine resin, whose reactivity is promoted by an acid catalyst, the acid catalyst effect of the phosphate group improves curability. Accordingly, a coating film also having excellent performance, such as water resistance, can be obtained.

In Formula (1) above, $R^1$ is substituted or unsubstituted hydrocarbon. In terms of the appearance (e.g., distinctness of image and metallic feel) and water resistance of the resulting coating film, $R^1$ is preferably hydrocarbon having 2 to 20 carbon atoms, more preferably 4 to 20 carbon atoms, even more preferably 7 to 20 carbon atoms, and particularly preferably 7 to 16 carbon atoms.

The hydrocarbon group is preferably linear or branched alkyl, and particularly preferably branched alkyl. Examples of $C_{2-20}$ linear or branched alkyl include ethyl, n-propyl, isopropyl, n-butyl, isobutyl, sec-butyl, tert-butyl, n-pentyl, n-hexyl, 2-ethylbutyl, 3-methylpentyl, 1,2-dimethylbutyl, n-heptyl, 2-ethylpentyl, 3-ethylpentyl, 1,4-dimethylpentyl, 2-methyl-1-isopropylpropyl, 1-ethyl-3-methylbutyl, n-octyl, 4-ethylhexyl, 3-methyl-1-isopropylbutyl, 2-methyl-1-isopropylbutyl, 3,4,4-trimethylpentyl, 1,5-dimethylhexyl, n-nonyl, 2-ethylheptyl, 3,5,5-trimethylhexyl, 1,6-dimethylheptyl, n-decyl, 2-ethyloctyl, 4-ethyloctyl, 3,6,6-trimethylheptyl, 1,7-dimethyloctyl, n-undecyl, 2-ethylnonyl, 3,7,7-trimethyloctyl, 1,8-dimethylnonyl, n-dodecyl, 2-ethyldecyl, 3,8,8-trimethylnonyl, 1,9-dimethyldecyl, n-tridecyl, 2-ethylundecyl, 3,9,9-trimethyldecyl, 1,10-dimethylundecyl, n-tetradecyl, 2-ethyldodecyl, 3,10,10-trimethylundecyl, 1,11-dimethyldodecyl, n-pentadecyl, 2-ethyltridecyl, 3,11,11-trimethyldodecyl, 1,12-dimethyltridecyl, n-hexadecyl, 2-ethyltetradecyl, 3,12,12-trimethyltridecyl, 1,13-dimethyltetradecyl, n-heptadecyl, 2-ethylpentadecyl, 3,13,13-trimethyltetradecyl, 1,14-dimethylpentadecyl, n-octadecyl, 2-ethylhexadecyl, 3,14,14-trimethylpentadecyl, 1,15-dimethylhexadecyl, n-nonadecyl, 2-ethylheptadecyl, 3,15,15-trimethylhexadecyl, 1,16-dimethylheptadecyl, n-icosyl, 2-ethyloctadecyl, 3,16,16-trimethylheptadecyl, 1,17-dimethyloctadecyl, and the like. Of these, $R^1$ in Formula (1) is particularly preferably $C_{7-20}$ branched alkyl.

When $R^1$ is branched alkyl, a coating film having excellent distinctness of image can be formed, even when the present coating composition is applied after being stored for a relatively long period of time.

When $R^1$ is substituted hydrocarbon, examples of substituents include halogen (e.g., fluorine, chlorine, bromine, etc.), alkenyl (e.g., $C_{2-6}$ alkenyl having 1 or 2 carbon-carbon double bonds, such as vinyl, allyl, 2-butenyl, 3-butenyl, 2-pentenyl, 1,3-pentadienyl, and 2-hexenyl), aryl (e.g., $C_{6-16}$ aryl, such as phenyl, naphthyl, biphenyl, anthracenyl, phenanthryl, and pyrenyl), alkoxy (e.g., $C_{1-6}$ alkoxy, such as methoxy, ethoxy, n-propoxy, isopropoxy, n-butoxy, isobutoxy, sec-butoxy, tert-butoxy, n-pentyloxy, n-hexyloxy, 2-ethylbutoxy, 3-methylpentyloxy, and 1,2-dimethylbutoxy), and the like.

The phosphoric acid compound (C) can be obtained by, for example, reacting a phosphorylating agent, such as orthophosphoric acid, phosphorus pentaoxide (anhydrous phosphoric acid), polyphosphoric acid, or phosphorus oxychloride, with an alcohol or an alcohol alkylene oxide adduct obtained by addition reaction of an alkylene oxide to an alcohol.

The reaction of a phosphorylating agent with an alcohol or an alcohol alkylene oxide adduct can be performed by a known method. In that case, the alcohol and alcohol alkylene oxide adduct may be independently used singly or in a combination of two or more.

The phosphoric acid compound (C) represented by Formula (1) is generally obtained as a mixture of a monoester and a diester.

Examples of alcohols include ethanol, propanol, isopropanol, butanol, isobutanol, pentanol, hexanol, 2-ethylbutanol, 3-methylpentanol, cyclohexyl alcohol, heptanol, 2-ethylpentanol, 3-ethylpentanol, octanol, 2-ethylhexanol, 4-ethylhexanol, nonyl alcohol, 2-ethylheptanol, decanol, 2-ethyloctanol, 4-ethyloctanol, dodecanol, hexadecanol, octadecanol, and the like.

Preferred among these are alcohols having $C_{7-20}$ alkyl, such as heptanol, 2-ethylpentanol, 3-ethylpentanol, octanol, 2-ethylhexanol, 4-ethylhexanol, nonyl alcohol, 2-ethylheptanol, decanol, 2-ethyloctanol, 4-ethyloctanol, dodecanol, hexadecanol, and octadecanol; and particularly preferred are alcohols having $C_{7-20}$ branched alkyl, such as 2-ethylpentanol, 3-ethylpentanol, 2-ethylhexanol, 4-ethylhexanol, 2-ethylheptanol, 2-ethyloctanol, and 4-ethyloctanol.

Examples of alkylene oxides include $C_{2-4}$ alkylene oxides, such as ethylene oxide, propylene oxide, and butylene oxide. These can be used singly or in a combination of two or more. Of these, ethylene oxide can be preferably used. Therefore, in Formula (1), examples of the oxyalkylene unit ($R^2O$) include oxyethylene, oxypropylene, oxybutylene, etc. A plurality of oxyalkylene units may be the same or different. Moreover, the oxyalkylene unit ($R^2O$) is preferably oxyethylene etc.

In Formula (1), n is the addition mole number of alkylene oxide. n is preferably 1 to 20, more preferably 1 to 10, and even more preferably 1 to 5. In a preferred embodiment, the phosphoric acid compound (C) may be a mixture of a phosphoric acid compound represented by Formula (1) wherein n is 0, and a phosphoric acid compound represented by Formula (1) wherein n is an integer of 1 to 20.

The number average molecular weight of the phosphoric acid compound (C) is preferably 100 to 3000, more preferably 100 to 2500, and even more preferably 100 to 2000. The molecular weight of the phosphoric acid compound (C) can be calculated based on information of the molecular weight of the raw materials used and the synthesis conditions. Moreover, the average molecular weight of the phosphoric acid compound (C) can be measured in the same manner as described above regarding the water-soluble acrylic resin (B).

The HLB value of the phosphoric acid compound (C) is preferably 3 to 17, more preferably 3 to 15, and even more preferably 4 to 13.

If the HLB value is less than 3, hydrophilicity is low and emulsification ability is weak; therefore, the stability of the coating composition, smoothness, distinctness of image, the flip flop property, etc., in the case of an effect coating film, may be insufficient.

If the HLB value exceeds 17, hydrophilicity is overly high; therefore, the water resistance of the resulting coating film may be reduced, and popping resistance during coating may be reduced.

The HLB value is a value expressing the degree of affinity of surfactants with water and oil (organic compounds insoluble in water). HLB is an acronym for Hydrophile-Lipophile Balance.

In the present invention, the HLB value is calculated using the following Griffin equation based on a mass fraction:

$$HLB=20(MH/M)$$

wherein MH represents the molecular weight of the hydrophilic group moiety, and M represents the molecular weight of the compound (surfactant).

In the present invention, the HLB value of the phosphoric acid compound (C) is defined as the HLB value of a non-ionic compound used as a raw material in the production of the phosphoric acid compound (C).

Specifically, as described above regarding the production of the phosphoric acid compound (C), the phosphoric acid compound (C) is obtained by reacting a phosphorylating agent with an alcohol or an alcohol alkylene oxide adduct. The HLB value of the phosphoric acid compound (C) of the present invention refers to the HLB value of the alcohol alkylene oxide adduct among the raw materials for producing the phosphoric acid compound (C). In this case, if the alcohol, which is a raw material of the alcohol alkylene oxide adduct, is water-soluble, the HLB value cannot be calculated.

The phosphoric acid compound (C) may be used singly or in a combination of two or more. Moreover, the phosphoric acid compound (C) may be a commercial product or a synthesized product.

The amount of the phosphoric acid compound (C) is preferably 0.1 to 10 mass %, more preferably 0.3 to 7 mass %, and even more preferably 0.5 to 5 mass %, based on the total solids content of the components (A) and (B).

Crosslinking Agent (D)

The coating composition of the present invention may contain, if necessary, a crosslinking agent (D), in terms of the curability of the coating composition and the coating film performance, such as water resistance, of the resulting coating film.

The crosslinking agent is not particularly limited. A crosslinking agent that is reactive with the crosslinking reactive groups of the acrylic resin particles (A) and the water-soluble acrylic resin (B) can be used, depending on the crosslinking reactive groups.

Specific examples of the crosslinking agent (D) include amino resins, (blocked) polyisocyanate compounds, polyhydrazide compounds, polysemicarbazide compounds, carbodiimide group-containing compounds, oxazoline group-containing compounds, epoxy compounds, polycarboxylic acids, and the like. The curing agents may be used singly or in a combination of two or more.

As the resin composition of coating compositions for vehicles, the combination of hydroxy-containing resins, such as acrylic resins, and crosslinking agents that are reactive with the hydroxyl groups of such resins are generally widely used, in terms of the finished appearance and coating film performance. Thus, among the above crosslinking agents, amino resins and (blocked) polyisocyanate compounds can particularly be preferably used.

Examples of usable amino resins include partially or fully methylolated amino resins obtained by reacting amino components with aldehyde components. Examples of amino components include melamine, urea, benzoguanamine, acetoguanamine, steroguanamine, spiroguanamine, dicyandiamide, and the like. Examples of aldehyde components include formaldehyde, paraformaldehyde, acetaldehyde, benzaldehyde, and the like.

The methylolated amino resins in which some or all of the methylol groups have been etherified with suitable alcohols are also usable. Examples of alcohols that can be used for the etherification include methyl alcohol, ethyl alcohol, n-propyl alcohol, i-propyl alcohol, n-butyl alcohol, i-butyl alcohol, 2-ethyl-1-butanol, 2-ethyl-1-hexanol, and the like.

Preferred amino resins are melamine resins. Particularly preferred are a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl mixed etherified melamine resin obtained by etherifying some or all of the methylol groups of a partially or fully methylolated melamine resin with methyl alcohol and butyl alcohol. A methyl-butyl mixed etherified melamine resin is more preferable.

The weight average molecular weight of the melamine resin is preferably 400 to 6,000, more preferably 500 to 4,000, and even more preferably 600 to 3,000.

A commercially available product can be used as the melamine resin. Examples of commercially available products include "Cymel 202," "Cymel 203," "Cymel 204," "Cymel 211," "Cymel 212," "Cymel 238," "Cymel 251," "Cymel 253," "Cymel 254," "Cymel 303," "Cymel 323," "Cymel 324," "Cymel 325," "Cymel 327," "Cymel 350," "Cymel 370," "Cymel 380," "Cymel 385," "Cymel 1156," "Cymel 1158," "Cymel 1116," and "Cymel 1130" (all produced by Nihon Cytec Industries Inc.); "Resimene 735," "Resimene 740," "Resimene 741," "Resimene 745," "Resimene 746," and "Resimene 747" (all produced by Monsanto Co., Ltd.); "U-Van 120," "U-Van 20HS," "U-Van 20SE," "U-Van 2021," "U-Van 2028," and "U-Van 28-60" (all produced by Mitsui Chemicals, Inc.); "SUMIMAL M55," "SUMIMAL M30W," and "SUMIMAL M50W" (all produced by Sumitomo Chemical Co., Ltd.); and the like.

When a melamine resin is used, a sulfonic acid, such as paratoluenesulfonic acid, dodecylbenzenesulfonic acid, or dinonylnaphthalenesulfonic acid; a neutralization salt of such a sulfonic acid with amine; a neutralization salt of a phosphoric ester compound with amine; or the like may be used as a curing catalyst.

Polyisocyanate compounds have two or more isocyanate groups per molecule.

Specific examples of polyisocyanate compounds include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethyl caproate; aliphatic triisocyanates, such as lysine ester triisocyanate, 1,4,8-triisocyanateoctane, 1,6,11-triisocyanateundecane, 1,8-diisocyanato-4-isocyanatomethyloctane, 1,3,6-triisocyanatehexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, and norbornane diisocyanate; alicyclic triisocyanates, such as 1,3,5-triisocyanatecyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanates include aromatic-aliphatic diisocyanates, such as 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; aromatic tetraisocyanates, such as diphenylmethane-2,2',5,5'-tetraisocyanate; and the like.

Examples of polyisocyanate derivatives include dimers, trimers, biurets, allophanates, carbodiimides, uretdiones, urethoimines, isocyanurates, oxadiazinetriones, polymethylene polyphenyl polyisocyanates (crude MDI, polymeric MDI), crude TDI, and the like of polyisocyanate compounds mentioned above.

Further, usable polyisocyanate compounds are blocked polyisocyanate compounds obtained by blocking free isocyanate groups of polyisocyanate compounds with a blocking agent. When a blocked polyisocyanate compound is heated to, for example, 100° C. or more, preferably 130° C. or more, the isocyanate groups are regenerated and can readily react with reactive groups.

Examples of such blocking agents include phenol-based blocking agents, such as phenol, cresol, xylenol nitrophenol, ethylphenol, hydroxydiphenyl, butylphenol, isopropylphenol, nonylphenol, octylphenol, and hydroxymethyl benzoate; lactam-based blocking agents; such as ε-caprolactam, δ-valerolactam, γ-butyrolactam, and β-propiolactam; aliphatic alcohol-based blocking agents, such as methanol, ethanol, propyl alcohol, butyl alcohol, amyl alcohol, and lauryl alcohol; ether-based blocking agents, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; benzyl alcohol; glycolic acid; glycolates, such as methyl glycolate, ethyl glycolate, and butyl glycolate; lactic acid; lactates, such as methyl lactate, ethyl lactate, and butyl lactate; alcohol-based blocking agents, such as methylol urea, methylol melamine, diacetone alcohol, 2-hydroxyethyl acrylate, and 2-hydroxyethyl methacrylate; oxime-based blocking agents, such as formamidoxime, acetamidooxime, acetoxime, methylethylketoxime, diacetyl monoxime, benzophenone oxime, and cyclohexaneoxime; active methylene-based blocking agents, such as dimethyl malonate, diethyl malonate, ethyl acetoacetate, methyl acetoacetate, and acetylacetone; mercaptan-based blocking agents, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based blocking agents, such as acetanilide, acetanisidide, acetotoluide, acrylamide, methacrylamide, acetamide, stearamide, and benzamide; imide-based blocking agents, such as succinimide, phthalimide, and maleimide; amine-based blocking agents, such as diphenylamine, phenylnaphthylamine, xylidine, N-phenylxylidine, carbazole, aniline, naphthylamine, butylamine, dibutylamine, and butylphenylamine; imidazole-based blocking agents, such as imidazole and 2-ethylimidazole; pyrazole-based blocking agents, such as 3,5-dimethylpyrazole; urea-based blocking agents, such as urea, thiourea, ethylene urea, ethylene thiourea, and diphenylurea; carbamate-based blocking agents, such as phenyl N-phenylcarbamate; imine-based blocking agents, such as ethyleneimine and propyleneimine; sulfite salt-based blocking agents, such as sodium bisulfite and potassium bisulfite; and other blocking agents.

When a polyisocyanate compound is used, an organic tin compound or the like can be used as a curing catalyst.

Polyisocyanate compounds can be used as crosslinking agents, for example, for resins containing a hydroxyl or amino group.

Polyhydrazide compounds have two or more hydrazide groups per molecule.

Examples of polyhydrazide compounds include saturated aliphatic carboxylic acid dihydrazides having 2 to 18 carbon atoms, such as oxalic acid dihydrazide, malonic acid dihydrazide, succinic acid dihydrazide, glutaric acid dihydrazide, adipic acid dihydrazide, and sebacic acid dihydrazide; dihydrazides of monoolefinic unsaturated dicarboxylic acids, such as maleic acid dihydrazide, fumaric acid dihydrazide, and itaconic acid dihydrazide; polyhydrazides of carbonic acids, such as carbonic acid dihydrazide; polyhydrazides of aromatic polycarboxylic acids, such as dihydrazides of phthalic acid, terephthalic acid, or isophthalic acid, and dihydrazide, trihydrazide, or tetrahydrazide of pyromellitic acid; aliphatic trihydrazides, such as nitrilotriacetic acid trihydrazide, citric acid trihydrazide, and 1,2,4-benzene trihydrazide; tetrahydrazides, such as ethylenediaminetetraacetic acid tetrahydrazide and 1,4,5,8-naphthoic acid tetrahydrazide; polyhydrazides obtained by reacting a low polymer having a carboxylic acid lower alkyl ester group with hydrazine or hydrazine hydrate (see JPS52-22878B); and the like.

A polyhydrazide compound with overly high hydrophobicity makes dispersion in water difficult, and a uniform crosslinked coating film cannot be obtained. Thus, it is preferable to use a compound with moderate hydrophilicity having a relatively low molecular weight (about 300 or less). Examples of such polyhydrazide compounds include dihydrazide compounds of $C_4$-$C_{12}$ dicarboxylic acids, such as succinic acid dihydrazide, glutaric acid dihydrazide, adipic acid dihydrazide, and sebacic acid dihydrazide.

Polyhydrazide compounds can be used as crosslinking agents, for example, for resins containing a carbonyl group.

Polysemicarbazide compounds have two or more semicarbazide groups per molecule.

Examples of polysemicarbazide compounds include aliphatic, alicyclic, or aromatic bissemicarbazides; polyfunctional semicarbazides obtained by reacting diisocyanates, such as hexamethylene diisocyanate or isophorone diisocyanate, or polyisocyanate compounds derived therefrom, with excess N,N-substituted hydrazines, such as N,N-dimethylhydrazine, and/or hydrazides mentioned above; aqueous polyfunctional semicarbazides obtained by reacting isocyanate groups of reaction products of polyisocyanate compounds mentioned above, polyether, and active hydrogen compounds containing a hydrophilic group, such as polyol compounds or polyethylene glycol monoalkyl ether compounds, with excess dihydrazides mentioned above (see, for example, JPH08-151358A); compounds having a semicarbazide group, such as mixtures of polyfunctional semicarbazides mentioned above and aqueous polyfunctional semicarbazides mentioned above; compounds having a hydrazone group, such as bisacetyl dihydrazone; and the like.

Polysemicarbazide compounds can be used as crosslinking agents, for example, for resins containing a carbonyl group.

Carbodiimide group-containing compounds are obtained, for example, by reacting isocyanate groups of polyisocyanate compounds with each other to remove carbon dioxide.

Examples of corresponding commercially available products include "Carbodilite V-02," "Carbodilite V-02-L2," "Carbodilite V-04," "Carbodilite E-01," and "Carbodilite E-02" (trade names, all produced by Nisshinbo Industries, Inc.).

Carbodiimide group-containing compounds can be used as crosslinking agents, for example, for resins containing a carboxyl group.

Examples of oxazoline group-containing compounds include (co)polymers obtained by copolymerizing polymers having an oxazoline group, such as polymerizable unsaturated monomers having an oxazoline group, optionally with other polymerizable unsaturated monomers by a known method (e.g., solution polymerization, emulsion polymerization, etc.).

Examples of polymerizable unsaturated monomers having an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and the like.

Examples of other polymerizable unsaturated monomers include $C_{1-24}$ alkyl or cycloalkyl esters of (meth)acrylic acid, such as methyl (meth)acrylate, ethyl (meth)acrylate, propyl (meth)acrylate, butyl (meth)acrylate, 2-ethylhexyl (meth) acrylate, cyclohexyl (meth)acrylate, lauryl (meth)acrylate, and isobornyl (meth)acrylate; $C_{2-8}$ hydroxyalkyl esters of (meth)acrylic acid, such as 2-hydroxyethyl (meth)acrylate and hydroxypropyl (meth)acrylate; vinyl aromatic compounds, such as styrene and vinyl toluene; adducts of (meth)acrylamide, dimethylaminopropyl (meth)acrylamide, dimethylaminoethyl (meth)acrylate, or glycidyl (meth)acrylate with amine compounds; polyethylene glycol (meth) acrylate; N-vinyl pyrrolidone, ethylene, butadiene, chloroprene, vinyl propionate, vinyl acetate, (meth)acrylonitrile, and the like. These can be suitably selected singly or in a combination of two or more.

Oxazoline group-containing compounds can be used as crosslinking agents, for example, for resins containing a carboxyl group.

Epoxy compounds have two or more epoxy groups per molecule. Specific examples include diepoxy compounds, such as bis(3,4-epoxycyclohexylmethyl)adipate, epoxy group-containing acrylic resins, and the like.

Epoxy compounds can be used as crosslinking agents, for example, for resins containing an acid or amino group.

Examples of polycarboxylic acids include aliphatic polybasic acid compounds, such as adipic acid, azelaic acid, sebacic acid, 1,4-cyclohexanedicarboxylic acid, 1,2-cyclohexanedicarboxylic acid, 1,2,4-butanetricarboxylic acid, and 1,2,3,4-butanetetracarboxylic acid; aromatic polybasic acid compounds, such as phthalic acid, isophthalic acid, terephthalic acid, and trimellitic acid; half-esters produced by addition reaction of polyol and 1,2-acid anhydride; addition reaction product of polyepoxide and 1,2-acid anhydride in an amount of 2 equivalents or more relative to the epoxy groups of the polyepoxide; carboxy-containing acrylic polymers; acrylic polymers having a group obtained by half-esterification of an acid anhydrous group; carboxy-containing polyester-based polymers; and the like.

Polycarboxylic acid can be used as crosslinking agents, for example, for epoxy or carbodiimide group-containing resins.

Aqueous Coating Composition

The amounts of the acrylic resin particles (A), the water-soluble acrylic resin (B), the phosphoric acid compound (C), and the crosslinking agent (D) in the aqueous coating composition of the present invention are as follows. Based on the total resin solids content of the components (A), (B), and (D) (when an optionally used resin, other than the components (A) and (B), is contained, including the resin), the amount of the acrylic resin particles (A) is 1 to 60 mass %, preferably 5 to 50 mass %, and more preferably 10 to 40 mass %; the amount of the water-soluble acrylic resin (B) is 1 to 40 mass %, preferably 3 to 30 mass %, and more preferably 5 to 30 mass %; the amount of the crosslinking agent (D) is 0 to 60 mass %, preferably 0 to 40 mass %, and more preferably 0 to 30 mass %; and the amount of the phosphoric acid compound (C) is 0.1 to 10 mass %, preferably 0.3 to 7 mass %, and more preferably 0.5 to 5 mass %.

In the aqueous coating composition of the present invention, a pigment can be used, if necessary. Examples of pigments include color pigments, such as titanium oxide, zinc white, carbon black, phthalocyanine blue, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; effect pigments, such as aluminum powder, mica powder, and titanium oxide-coated mica powder; and the like.

The amount of the pigment is generally 0 to 250 mass %, and particularly 3 to 150 mass %, based on the total resin solids content of the components (A) and (B), and the optionally added component (D).

In the aqueous coating composition of the present invention, a curing catalyst, a dispersant, an anti-settling agent, an organic solvent, an antifoaming agent, a thickener, an ultraviolet absorber, a light stabilizer, a surface control agent, etc., can be suitably used, if necessary.

The aqueous coating composition of the present invention can provide a coating film that has an excellent finished appearance, such as smoothness and distinctness of image, as well as metallic feel and no metallic mottling when the composition comprises an effect pigment; and that has excellent coating film performance, such as water resistance. The aqueous coating composition of the present invention also has excellent storage stability. Therefore, the aqueous coating composition of the present invention is suitably used as, for example, a coating composition for building materials, buildings, vehicles, etc., and particularly as an aqueous coating composition for vehicles.

Before use, the aqueous coating composition of the present invention may be diluted to an appropriate viscosity by adding water and/or an organic solvent, etc., if necessary, and then applied.

The appropriate viscosity may vary depending on the formulation of the coating composition, but is generally in the range of about 20 to 60 seconds, and preferably about 25 to 50 seconds, as adjusted and measured at 20° C. using Ford cup viscometer No. 4. Moreover, in the above, the coating solids concentration of the present coating composition is generally about 5 to 70 mass %, and preferably about 10 to 50 mass %.

Substrate

The substrate to which the aqueous coating composition of the present invention can be applied is not particularly limited. Examples include exterior panels of vehicle bodies, such as automobiles, trucks, motorcycles, and buses; automobile parts; exterior panels of home appliances, such as mobile phones and audio equipment; etc. Of these, exterior panels of vehicle bodies and automobile parts are preferable.

The base materials that constitute these substrates are not particularly limited. Examples include metal plates, such as iron plates, aluminum plates, brass plates, copper plates, stainless steel plates, tin plates, galvanized steel plates, and alloyed zinc (Zn—Al, Zn—Ni, Zn—Fe, etc.)-plated steel plates; plastic materials, such as resin (e.g., polyethylene resin, polypropylene resin, acrylonitrile-butadiene-styrene (ABS) resin, polyamide resin, acrylic resin, vinylidene chloride resin, polycarbonate resin, polyurethane resin, and epoxy resin) and various types of FRPs; inorganic materials, such as glass, cement, and concrete; lumber; fibrous materials (paper, cloth, etc.); and the like. Of these, metal plates and plastic materials are preferable.

Moreover, the above substrate may be obtained by forming an undercoating film, or an undercoating film and an intermediate coating film, on a base material mentioned above. When the base material is metal, chemical conversion with phosphate, chromate, composite oxide, etc., is preferably performed beforehand prior to the formation of an undercoating film.

The undercoating film is formed for the purpose of imparting anticorrosion properties, adhesion with the base material, masking properties for the unevenness of the surface of the base material (also referred to as "substrate-masking properties"), etc. The undercoating composition used to form an undercoating film may be one that is known per se. For example, cationic electrodeposition coating compositions and/or anion electrodeposition coating compositions are preferably used for conductive base materials, such as metal. Further, chlorinated polyolefin resin-based coating compositions etc. are preferably used for low-polar base materials, such as polypropylene.

The undercoating composition may be cured by heating, ventilation, or other means after application thereof, or may be dried so that the undercoating composition is not cured. When a cationic electrodeposition coating composition and/or an anion electrodeposition coating composition are used as the undercoating composition, in order to prevent the formation of a mixed layer between the undercoating film and a coating film subsequently formed on the undercoating film, and to form a multilayer coating film having an excellent appearance, it is preferable to cure the undercoating film by heating after the undercoating composition is applied.

Moreover, the above intermediate coating film is formed on the undercoating film, for the purpose of imparting adhesion between the undercoating film and the top coating composition, masking properties for the color of the undercoating film (also referred to as "color-masking properties"), masking properties for the unevenness of the surface of the undercoating film, chipping resistance, etc.

The intermediate coating film can be formed by applying an intermediate coating composition. The film thickness thereof is preferably such that the cured film thickness is generally 10 to 50 µm, and particularly 15 to 30 µm.

Usable examples of the intermediate coating composition include conventionally known thermosetting intermediate coating compositions. Specific examples include coating compositions obtained by suitably combining base resins, such as alkyd resins, polyester resins, acrylic resins, and urethane resins, and curing agents, such as amino resins, polyisocyanate compounds, blocked polyisocyanate compounds, and carbodiimide group-containing compounds, which are reactive with the reactive functional groups contained in the base resins. As the intermediate coating composition, high-solid coating compositions, aqueous coating compositions, powder coating compositions, and the like that use smaller amounts of organic solvents can be preferably used, in terms of environmental problems, resource saving, etc.

It is preferable that the intermediate coating composition is cured, semi-cured, or dried to touch by means of heating, ventilation, etc., after the application thereof, because the formation of a mixed layer between the intermediate coating film and a coating composition subsequently applied to the intermediate coating film is prevented, and a multilayer coating film having an excellent appearance can be formed.

When an aqueous intermediate coating composition is used as the intermediate coating composition, it is preferable to perform preliminary heating (preheating) at room temperature to 100° C., preferably 40 to 90° C., for 1 to 15 minutes after the aqueous intermediate coating composition is applied, in terms of preventing the occurrence of coating film defects, such as cissing.

Coating Method

The method for applying the present coating composition to a substrate mentioned above is not particularly limited. For example, air spray coating, airless spray coating, rotary atomization coating, curtain coating, or other coating methods may be used to form a wet coating film. In these coating methods, an electrostatic charge may be applied, if necessary. Of these methods, rotary-atomization electrostatic coating and air spray electrostatic coating are preferable, and rotary-atomization electrostatic coating is particularly preferable.

Such a coating method can be carried out in a single step or multiple steps until a desired film thickness is obtained.

The Wet coating film can be cured by, after application of the present coating composition to a substrate, optionally heating at room temperature to 170° C., for example.

Heating can be performed by known heating means. For example, drying furnaces, such as hot-air furnaces, electric furnaces, infrared induction heating furnaces, etc., can be used. The heating temperature is generally 80 to 180° C., and preferably 100 to 160° C. The heating time is not particularly limited, but is generally about 20 to 40 minutes.

Before performing heat-curing, preheating may be performed, if necessary, at a temperature of about 50 to 80° C. for about 3 to 10 minutes, in order to promote the vaporization of volatile components, such as solvent.

Regarding the film thickness of the present coating composition, the cured film thickness is generally in the range of 3 to 100 m, and preferably 5 to 60 m.

Moreover, the present coating composition can be suitably used in a method for forming a multilayer coating film by a 2-coat 1-bake process comprising applying the present coating composition to a substrate, applying a clear coating composition to the uncured coating film without curing the coating film, and simultaneously curing by heating the coating film of the present coating composition and the clear coating film. The above uncured coating film includes a film in a set-to-touch condition and a film in a dry-to-touch condition.

When the present coating composition is applied by the 2-coat 1-bake process, the present coating composition is preferably applied so that the dry film thickness is 5 to 40 µm, preferably 10 to 30 µm, and more preferably 10 to 20 µm. The clear coating composition is preferably applied so that the dry film thickness is 10 to 80 µm, and preferably 15 to 60 µm.

When a multilayer coating film is formed by the 2-coat 1-bake process, it is preferable to perform preheating (preliminary heating) under heating conditions in which the coating film is not substantially cured, after application of the present coating composition, in terms of preventing the occurrence of coating film defects, such as cissing. The preheating temperature is room temperature to 100° C., and preferably 40 to 90° C. The preheating time is 30 seconds to 15 minutes, and preferably 1 to 5 minutes. After the clear coating composition is applied, it can be cured by heating at room temperature, if necessary, after an interval of about 1 to 60 minutes, preferably 3 to 20 minutes, or after preheating at about 40 to 80° C. for about 1 to 60 minutes.

Curing of the present coating composition (base coating composition) and the clear coating composition can be performed by a known heating means mentioned above. It is preferable to simultaneously cure both coating films by heating at a temperature of 80 to 180° C., preferably 100 to 160° C., for about 10 to 40 minutes.

A coating film having excellent coating film performance and an excellent appearance can be formed by using the present coating composition; therefore, the present coating composition can be suitably used as a coating composition for vehicles.

Moreover, examples of the clear coating composition include those that are known per se and generally used in the coating of vehicle bodies. Specific examples include organic solvent-based thermosetting coating compositions, aqueous thermosetting coating compositions, thermosetting powder coating compositions, and the like that comprise, as resin components, a base resin, such as acrylic resin, polyester resin, alkyd resin, urethane resin, epoxy resin, or fluororesin, which have a crosslinkable functional group (e.g., hydroxyl, carboxyl, epoxy, or silanol); and a crosslinking agent, such as melamine resin, urea resin, blocked or unblocked polyisocyanate compound, carboxy-containing compound or resin, or epoxy-containing compound or resin.

Preferred among these are thermosetting coating compositions comprising a carboxy-containing resin and an epoxy-containing resin, and thermosetting coating compositions comprising a hydroxy-containing resin and a blocked or unblocked polyisocyanate compound.

The clear coating composition may be a one-component coating composition, or a two-component coating composition, such as a two-component urethane resin coating composition.

Further, the clear coating composition may contain a color pigment, an effect pigment, a dye, etc., if necessary, as long as the transparency is not impaired. The clear coating composition may further suitably contain an extender pigment, an ultraviolet absorber, a light stabilizer, an antifoaming agent, a thickener, an anticorrosive, a surface control agent, and the like.

As described above, the coating composition of the present invention is coated by applying it to a substrate, followed by curing. Therefore, the present invention also provides an article having a coating film obtained by curing the coating composition of the present invention (e.g., vehicles and parts thereof).

EXAMPLES

The present invention is described in further detail below with reference to Examples and Comparative Examples. However, the present invention is not limited to only these Examples. Note that "parts" and "%" are expressed on a mass basis.

Production of Acrylic Resin Particles (A)

Production Example 1

130 parts of deionized water and 0.52 parts of Aqualon KH-10 (Note 1) were placed in a reactor equipped with a thermometer, a thermostat, a stirrer, a reflux condenser, and a dropping funnel. The mixture was stirred and mixed in a nitrogen stream, and heated to 80° C. Subsequently, 1% of the total amount of a monomer emulsion 1 described below and 5.3 parts of a 6% ammonium persulfate aqueous solution were introduced into the reactor, and maintained at 80° C. for 15 minutes. The rest of the monomer emulsion 1 was then added dropwise to the reactor over 3 hours while the reactor was maintained at the same temperature. After completion of the dropwise addition, the mixture was aged for 1 hour. Thereafter, a monomer emulsion 2 described below was added dropwise over 1 hour, and the mixture was aged for 1 hour. Then, while 40 parts of a 5% dimethylethanolamine aqueous solution was gradually added to the reactor, the mixture was cooled to 30° C., and filtered through a 100-mesh nylon cloth to obtain acrylic resin particles (A1) having an average particle size of 120 nm (as measured at 20° C. using a "COULTER N4" submicron particle size distribution analyzer (produced by Beckman Coulter, Inc.) in a state diluted with deionized water), a solids concentration of 30%, an acid value of 33 mgKOH/g, and a hydroxy value of 25 mgKOH/g.

(Note 1) Aqualon KH-10: a polyoxyethylene alkyl ether sulfate ester ammonium salt, produced by Dai-ichi Kogyo Seiyaku Co., Ltd.; active ingredient: 97%

Monomer emulsion 1: The monomer emulsion 1 was obtained by mixing and stirring 42 parts of deionized water, 0.72 parts of Aqualon KH-10, 2.1 parts of methylenebis acrylamide, 2.8 parts of styrene, 16.1 parts of methyl methacrylate, 28 parts of ethyl acrylate, and 21 parts of n-butyl acrylate.

Monomer emulsion 2: The monomer emulsion 2 was obtained by mixing and stirring 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate.

Production Examples 2 to 4

Acrylic resin particles (A2) to (A4) were obtained in the same manner as in Production Example 1, except that the formulation was changed to those shown in Table 1 below. Table 1 shows the solids concentration, acid value, hydroxy value, and average particle size (as measured at 20° C. using a "COULTER N4" submicron particle size distribution analyzer (produced by Beckman Coulter, Inc.) in a state diluted with deionized water) of the resulting acrylic resin particles (A1) to (A4), together with the results of Production Example 1.

completion of the dropwise addition, the mixture was aged for 1 hour. Thereafter, a mixture of 10 parts of propylene glycol monopropyl ether and 1 part of 2,2'-azobis(2,4-dimethylvaleronitrile) was further added dropwise to the flask over 1 hour. After completion of the dropwise addition, the mixture was aged for 1 hour. Further, 7.4 parts of diethanolamine was added, thereby obtaining a water-soluble acrylic resin (B1) having a solids concentration of 55%, an acid value of 47 mgKOH/g, and a hydroxy value of 72 mgKOH/g.

Production Example 6

35 parts of propylene glycol monopropyl ether was placed in a flask, and heated to 85° C. Then, a mixture of 28 parts of methyl methacrylate, 20 parts of 2-ethylhexyl acrylate, 29 parts of n-butyl acrylate, 17 parts of hydroxyethyl methacrylate, 6 parts of acrylic acid, 15 parts of propylene glycol monopropyl ether, and 2.3 parts of 2,2'-azobis(2,4-dimethylvaleronitrile) was added dropwise to the flask over 4 hours. After completion of the dropwise addition, the mixture was aged for 1 hour. Thereafter, a mixture of 10 parts of propylene glycol monopropyl ether and 1 part of 2,2'-azobis(2,4-dimethylvaleronitrile) was further added dropwise to the flask over 1 hour. After completion of the dropwise addition, the mixture was aged for 1 hour. Further, 7.4 parts of diethanolamine was added, thereby obtaining a

TABLE 1

| | Production Examples | 1 | 2 | 3 | 4 |
|---|---|---|---|---|---|
| | Acrylic resin particles (A) | A1 | A2 | A3 | A4 |
| | Deionized water | | 130 | | |
| | Aqualon KH-10 (Note 1) | | 0.52 | | |
| | Deionized water | | 5 | | |
| | Ammonium persulfate | | 0.3 | | |
| Monomer emulsion 1 | Deionized water | | 42 | | |
| | Aqualon KH-10 (Note 1) | | 0.72 | | |
| | Allyl methacrylate | | | 2.1 | |
| | Methylenebis acrylamide | 2.1 | 2.1 | | 4.8 |
| | Styrene | 2.8 | 2.8 | 2.8 | 2.8 |
| | Methyl methacrylate | 16.1 | 16.1 | 16.1 | 13.4 |
| | Ethyl acrylate | 28 | 28 | 28 | 28 |
| | n-Butyl acrylate | 21 | 21 | 21 | 21 |
| Monomer emulsion 2 | Deionized water | | 18 | | |
| | Aqualon KH-10 (Note 1) | | 0.31 | | |
| | Ammonium persulfate | | 0.03 | | |
| | Methacrylic acid | 5.1 | 5.1 | 5.1 | 5.1 |
| | 2-Hydroxyethyl acrylate | 5.1 | 5.1 | 5.1 | 1.1 |
| | 2-Ethylhexyl acrylate | | 3 | | |
| | Styrene | 3 | | 3 | |
| | Methyl methacrylate | 6 | 6 | 6 | 13 |
| | Ethyl acrylate | 1.8 | 1.8 | 1.8 | 1.8 |
| | n-Butyl acrylate | 9 | 9 | 9 | 9 |
| 5% dimethylethanolamine aqueous solution | | | 40 | | |
| Solids concentration (mass %) | | | 30 | | |
| Acid value (mgKOH/g) | | 33 | 33 | 33 | 33 |
| Hydroxy value (mgKOH/g) | | 25 | 25 | 25 | 5 |
| Average particle size (nm) | | 120 | 118 | 117 | 114 |

Production Example 5

35 parts of propylene glycol monopropyl ether was placed in a flask, and heated to 85° C. Then, a mixture of 30 parts of methyl methacrylate, 20 parts of 2-ethylhexyl acrylate, 29 parts of n-butyl acrylate, 15 parts of hydroxyethyl acrylate, 6 parts of acrylic acid, 15 parts of propylene glycol monopropyl ether, and 2.3 parts of 2,2'-azobis(2,4-dimethylvaleronitrile) was added dropwise to the flask over 4 hours. After water-soluble acrylic resin (B2) having a solids concentration of 55%, an acid value of 47 mgKOH/g, and a hydroxy value of 72 mgKOH/g.

Production Example 7

35 parts of propylene glycol monopropyl ether was placed in a flask, and heated to 85° C. Then, a mixture of 43 parts of methyl methacrylate, 20 parts of 2-ethylhexyl acrylate, 29 parts of n-butyl acrylate, 2 parts of hydroxyethyl acrylate, 6 parts of acrylic acid, 15 parts of propylene glycol monopropyl ether, and 1.1 parts of 2,2'-azobis(2,4-dimethylvaleronitrile) was added dropwise to the flask over 4 hours. After completion of the dropwise addition, the mixture was aged for 1 hour. Thereafter, a mixture of 10 parts of propylene glycol monopropyl ether and 1 part of 2,2'-azobis(2,4-dimethylvaleronitrile) was further added dropwise to the flask over 1 hour. After completion of the dropwise addition, the mixture was aged for 1 hour. Further, 7.4 parts of diethanolamine was added, thereby obtaining a water-soluble acrylic resin (B3) having a solids concentration of 55%, an acid value of 47 mgKOH/g, and a hydroxy value of 10 mgKOH/g.

Production Example 8

109 parts of trimethylolpropane, 141 parts of 1,6-hexanediol, 126 parts of hexahydrophthalic anhydride, and 120 parts of adipic acid were placed in a reactor equipped with a stirrer, a reflux condenser, a water separator, and a thermometer. After the temperature was increased from 160° C. to 230° C. over 3 hours, a condensation reaction was performed at 230° C. for 4 hours. Subsequently, in order to add carboxyl groups to the resulting condensation reaction product, 38.3 parts of trimellitic anhydride was further added, and allowed to react at 170° C. for 30 minutes. The reaction product was then diluted with ethylene glycol mono-2-ethylhexyl ether (mass dissolved in 100 g of water at 20° C.: 3.4 g), thereby obtaining a water-soluble polyester resin (E1) having an acid value of 46 mgKOH/g, a hydroxy value of 150 mgKOH/g, a solids concentration of 70%, and a weight average molecular weight of 6,400.

Production Example of Effect Pigment Concentrated Solution

Production Example 9

In a stirring-mixing vessel, 11 parts of aluminum pigment paste "GX-40A" (produced by Asahi Kasei Metals Co., Ltd., metal content: 74%), 10 parts of aluminum pigment paste "MH-8805" (produced by Asahi Kasei Metals Co., Ltd., metal content: 68%), 35 parts of ethylene glycol mono-2-ethylhexyl ether, 8 parts of a phosphate group-containing resin solution (Note 2), and 0.2 parts of 2-(dimethylamino) ethanol were uniformly mixed, thereby obtaining an effect pigment concentrated solution (P1).

(Note 2) Phosphate group-containing resin solution: A mixed solvent of 27.5 parts of methoxy propanol and 27.5 parts of isobutanol was placed in a reaction vessel equipped with a thermometer, a thermostat, a stirrer, a reflux condenser, and a dropping funnel, and heated to 110° C. Then, 121.5 parts of a mixture of 25 parts of styrene, 27.5 parts of n-butyl methacrylate, 20 parts of "Isostearyl Acrylate" (trade name, produced by Osaka Organic Chemical Industry Ltd., a branched higher alkyl acrylate), 7.5 parts of 4-hydroxybutyl acrylate, 15 parts of a phosphate group-containing polymerizable monomer (Note 3), 12.5 parts of 2-methacryloyloxyethyl acid phosphate, 10 parts of isobutanol, and 4 parts of t-butylperoxyoctanoate was added to the mixed solvent over 4 hours. Further, a mixture of 0.5 parts of t-butylperoxyoctanoate and 20 parts of isopropanol was added dropwise for 1 hour. Thereafter, the mixture was stirred and aged for 1 hour, thereby obtaining a phosphate group-containing resin solution having a solids concentration of 50%. The acid value of the present resin derived from the phosphate group was 83 mgKOH/g, the hydroxy value derived from the 4-hydroxybutyl acrylate was 29 mgKOH/g, and the weight average molecular weight was 10,000.

(Note 3) Phosphate group-containing polymerizable monomer: 57.5 parts of monobutyl phosphoric acid and 41 parts of isobutanol were placed in a reaction vessel equipped with a thermometer, a thermostat, a stirrer, a reflux condenser, and a dropping funnel, and heated to 90° C. After 42.5 parts of glycidyl methacrylate was added dropwise over 2 hours, the mixture was stirred and aged for 1 hour. Thereafter, 59 parts of isopropanol was added, thereby obtaining a phosphate group-containing polymerizable monomer solution having a solids concentration of 50%. The acid value of the obtained monomer derived from the phosphate group was 285 mgKOH/g.

Production of Aqueous Coating Composition (Aqueous Base Coating Composition)

Example 1

100 parts (solids content: 30 parts) of the acrylic resin particles (A1) obtained in Production Example 1, 73 parts (solids content: 40 parts) of the water-soluble acrylic resin (B1) obtained in Production Example 5, 50 parts (solids content: 30 parts) of a crosslinking agent (D1) (a methyl-butyl mixed etherified melamine resin; solids content: 60%, and weight average molecular weight: 2,000), 2 parts of a phosphoric acid compound (C1) (Note 4), and 64 parts of the effect pigment concentrated solution (P1) obtained in Production Example 9 were uniformly mixed. Further, deionized water and 2-(dimethylamino)ethanol were added, thereby obtaining an aqueous coating composition (X1) having a pH of 8.0 and a solids concentration of 23%.

(Note 4) Phosphoric acid compound (C1): in Formula (1), $R^1$ is $C_3$ linear alkyl, $R^2$ is ethylene, and n is 1; number average molecular weight: 227, HLB: 15 or more (an estimated value, because it cannot be calculated by the Griffin method). Note that m is 1 or 2, and the ratio of the monoester wherein m is 1 and the diester wherein m is 2 is 1:1.

Examples 2 to 28, 30, and 31, and Comparative Examples 1 to 5

Aqueous coating compositions (X2) to (X28) and (X30) to (X36) having a pH of 8.0 and a solids concentration of 23% were each obtained in the same manner as in Example 1, except that the formulation of Example 1 was changed as shown in Table 2 below. The phosphoric acid compounds (C2) to (C21) shown in Table 2 below are as follows. Note that in Formula (1) of all of the phosphoric acid compounds (C2) to (C21), m is 1 or 2, and the ratio of the monoester wherein m is 1 and the diester wherein m is 2 is 1:1.

(Note 5) Phosphoric acid compound (C2): in Formula (1), $R^1$ is $C_3$ branched alkyl, $R^2$ is ethylene, and n is 1; number average molecular weight: 227, HLB: 15 or more (an estimated value, because it cannot be calculated by the Griffin method)

(Note 6) Phosphoric acid compound (C3): in Formula (1), $R^1$ is $C_6$ linear alkyl, $R^2$ is ethylene, and n is 1; number average molecular weight: 290, HLB: 6.0

(Note 7) Phosphoric acid compound (C4): in Formula (1), $R^1$ is $C_6$ branched alkyl, $R^2$ is ethylene, and n is 1; number average molecular weight: 290, HLB: 6.0.

(Note 8) Phosphoric acid compound (C5): in Formula (1), $R^1$ is $C_7$ linear alkyl, $R^2$ is ethylene, and n is 1; number average molecular weight: 311, HLB: 5.5

(Note 9) Phosphoric acid compound (C6): in Formula (1), $R^1$ is $C_7$ branched alkyl, $R^2$ is ethylene, and n is 1; number average molecular weight: 311, HLB: 5.5

(Note 10) Phosphoric acid compound (C7): in Formula (1), $R^1$ is $C_8$ linear alkyl, $R^2$ is ethylene, and n is 1; number average molecular weight: 332, HLB: 5.1

(Note 11) Phosphoric acid compound (C8): in Formula (1), $R^1$ is $C_8$ branched alkyl, $R^2$ is ethylene, and n is 1; number average molecular weight: 332, HLB: 5.1

(Note 12) Phosphoric acid compound (C9): in Formula (1), $R^1$ is $C_9$ linear alkyl, $R^2$ is ethylene, and n is 1; number average molecular weight: 353, HLB: 4.7

(Note 13) Phosphoric acid compound (C10): in Formula (1), $R^1$ is $C_9$ branched alkyl, $R^2$ is ethylene, and n is 1; number average molecular weight: 353, HLB: 4.7

(Note 14) Phosphoric acid compound (C11): in Formula (1), $R^1$ is $C_{12}$ linear alkyl, $R^2$ is ethylene, and n is 1; number average molecular weight: 482, HLB: 6.4

(Note 15) Phosphoric acid compound (C12): in Formula (1), $R^1$ is $C_{18}$ linear alkyl, $R^2$ is ethylene, and n is 1; number average molecular weight: 674, HLB: 6.6

(Note 16) Phosphoric acid compound (C13): in Formula (1), $R^1$ is $C_7$ branched alkyl, and n is 0; number average molecular weight: 245, HLB: 5 or less (an estimated value, because it cannot be calculated by the Griffin method)

(Note 17) Phosphoric acid compound (C14): in Formula (1), $R^1$ is $C_7$ branched alkyl, $R^2$ is ethylene, and n is 3; number average molecular weight: 443, HLB: 10.6

(Note 18) Phosphoric acid compound (C15): in Formula (1), $R^1$ is $C_7$ branched alkyl, $R^2$ is ethylene, and n is 5; number average molecular weight: 575, HLB: 13.1

(Note 19) Phosphoric acid compound (C16): in Formula (1), $R^1$ is $C_7$ branched alkyl, $R^2$ is ethylene, and n is 10; number average molecular weight: 905, HLB: 15.8

(Note 20) Phosphoric acid compound (C17): in Formula (1), $R^1$ is $C_8$ branched alkyl, and n is 0; number average molecular weight 266, HLB: 5 or less (an estimated value, because it cannot be calculated by the Griffin method)

(Note 21) Phosphoric acid compound (C18): in Formula (1), $R^1$ is $C_8$ branched alkyl, $R^2$ is ethylene, and n is 3; number average molecular weight: 464, HLB: 10.1

(Note 22) Phosphoric acid compound (C19): in Formula (1), $R^1$ is $C_8$ branched alkyl, $R^2$ is ethylene, and n is 5; number average molecular weight: 596, HLB: 12.6

(Note 23) Phosphoric acid compound (C20): in Formula (1), $R^1$ is $C_1$ linear alkyl, $R^2$ is ethylene, and n is 1; number average molecular weight: 185, HLB: 15 or more (an estimated value, because it cannot be calculated by the Griffin method)

(Note 24) Phosphoric acid compound (C21): in Formula (1), $R^1$ is $C_{21}$ linear alkyl, $R^2$ is ethylene, and n is 7; number average molecular weight: 1001, HLB: 9.9.

Example 29

100 parts (solids content: 30 parts) of the acrylic resin particles (A1) obtained in Production Example 1, 36 parts (solids content: 20 parts) of the water-soluble acrylic resin (B1) obtained in Production Example 5, 29 parts (solids content: 20 parts) of the water-soluble polyester resin (E1) obtained in Production Example 8, 50 parts (solids content: 30 parts) of the crosslinking agent (D1) (a methyl-butyl mixed etherified melamine resin, solids content: 60%, weight average molecular weight: 2,000), 2 parts of the phosphoric acid compound (C6) (Note 9), and 64 parts of the effect pigment concentrated solution (P1) obtained in Production Example 9 were uniformly mixed. Further, deionized water and 2-(dimethylamino)ethanol were added to obtain an aqueous coating composition (X29) having a pH of 8.0 and a solids concentration of 23%.

Although it is not shown in Table 2, all of the aqueous coating compositions (X1) to (X36) contain 64 parts of the effect pigment concentrated solution (P1) obtained in Production Example 9.

TABLE 2

| | | Name of aqueous coating composition | Acrylic resin particles (A) | | Water-soluble acrylic resin (B) | | Other resin | | Crosslinking agent (D) | |
|---|---|---|---|---|---|---|---|---|---|---|
| | | | Type | Amount | Type | Amount | Type | Amount | Type | Amount |
| Examples | 1 | X1 | A1 | 100 | B1 | 73 | | | D1 | 50 |
| | 2 | X2 | A1 | 100 | B1 | 73 | | | D1 | 50 |
| | 3 | X3 | A1 | 100 | B1 | 73 | | | D1 | 50 |
| | 4 | X4 | A1 | 100 | B1 | 73 | | | D1 | 50 |
| | 5 | X5 | A1 | 100 | B1 | 73 | | | D1 | 50 |
| | 6 | X6 | A1 | 100 | B1 | 73 | | | D1 | 50 |
| | 7 | X7 | A1 | 100 | B1 | 73 | | | D1 | 50 |
| | 8 | X8 | A1 | 100 | B1 | 73 | | | D1 | 50 |
| | 9 | X9 | A1 | 100 | B1 | 73 | | | D1 | 50 |
| | 10 | X10 | A1 | 100 | B1 | 73 | | | D1 | 50 |
| | 11 | X11 | A1 | 100 | B1 | 73 | | | D1 | 50 |
| | 12 | X12 | A1 | 100 | B1 | 73 | | | D1 | 50 |
| | 13 | X13 | A1 | 100 | B1 | 73 | | | D1 | 50 |
| | 14 | X14 | A1 | 100 | B1 | 73 | | | D1 | 50 |
| | 15 | X15 | A1 | 100 | B1 | 73 | | | D1 | 50 |
| | 16 | X16 | A1 | 100 | B1 | 73 | | | D1 | 50 |
| | 17 | X17 | A1 | 100 | B1 | 73 | | | D1 | 50 |
| | 18 | X18 | A1 | 100 | B1 | 73 | | | D1 | 50 |
| | 19 | X19 | A1 | 100 | B1 | 73 | | | D1 | 50 |
| | 20 | X20 | A1 | 100 | B1 | 73 | | | D1 | 50 |
| | 21 | X21 | A1 | 100 | B1 | 73 | | | D1 | 50 |
| | 22 | X22 | A1 | 100 | B1 | 73 | | | D1 | 50 |
| | 23 | X23 | A1 | 100 | B1 | 73 | | | D1 | 50 |
| | 24 | X24 | A1 | 100 | B1 | 73 | | | D1 | 50 |

TABLE 2-continued

|  |  |  | | | | | | | | | |
|---|---|---|---|---|---|---|---|---|---|---|---|
| | 25 | X25 | A2 | 100 | B1 | 73 | | | D1 | 50 |
| | 26 | X26 | A3 | 100 | B1 | 73 | | | D1 | 50 |
| | 27 | X27 | A4 | 133 | B3 | 109 | | | | |
| | 28 | X28 | A1 | 100 | B2 | 73 | | | D1 | 50 |
| | 29 | X29 | A1 | 100 | B1 | 36 | E1 | 29 | D1 | 50 |
| | 30 | X30 | A1 | 100 | B1 | 73 | | | D2 | 79 |
| | 31 | X31 | A1 | 67 | B1 | 82 | | | D1 | 58 |
| Comparative Examples | 1 | X32 | A1 | 100 | B1 | 73 | | | D1 | 50 |
| | 2 | X33 | A1 | 100 | B1 | 73 | | | D1 | 50 |
| | 3 | X34 | A1 | 100 | B1 | 73 | | | D1 | 50 |
| | 4 | X35 | A1 | 100 | B1 | 73 | | | D1 | 50 |
| | 5 | X36 | A1 | 100 | B1 | 73 | | | D1 | 50 |

| | | | Phosphoric acid compound (C) | | | | | |
|---|---|---|---|---|---|---|---|---|
| | | | R1 | | R2 | | Number average | | |
| | | Type | Number of carbons | Structure | Number of carbons | n | molecular weight | HLB | Amount |
| Examples | 1 | C1 | 3 | Linear | 2 | 1 | 227 | 15 or more | 2 |
| | 2 | C2 | 3 | Branched | 2 | 1 | 227 | 15 or more | 2 |
| | 3 | C3 | 6 | Linear | 2 | 1 | 290 | 6.0 | 2 |
| | 4 | C4 | 6 | Branched | 2 | 1 | 290 | 6.0 | 2 |
| | 5 | C5 | 7 | Linear | 2 | 1 | 311 | 5.5 | 2 |
| | 6 | C6 | 7 | Branched | 2 | 1 | 311 | 5.5 | 1 |
| | 7 | C6 | 7 | Branched | 2 | 1 | 311 | 5.5 | 2 |
| | 8 | C6 | 7 | Branched | 2 | 1 | 311 | 5.5 | 4 |
| | 9 | C7 | 8 | Linear | 2 | 1 | 332 | 5.1 | 2 |
| | 10 | C8 | 8 | Branched | 2 | 1 | 332 | 5.1 | 2 |
| | 11 | C9 | 9 | Linear | 2 | 1 | 353 | 4.7 | 2 |
| | 12 | C10 | 9 | Branched | 2 | 1 | 353 | 4.7 | 2 |
| | 13 | C11 | 12 | Linear | 2 | 2 | 482 | 6.4 | 2 |
| | 14 | C12 | 18 | Linear | 2 | 3 | 674 | 6.6 | 2 |
| | 15 | C13 | 7 | Branched | | 0 | 245 | 5 or less | 2 |
| | 16 | C14 | 7 | Branched | 2 | 3 | 443 | 10..6 | 2 |
| | 17 | C15 | 7 | Branched | 2 | 5 | 575 | 13.1 | 2 |
| | 18 | C16 | 7 | Branched | 2 | 10 | 905 | 15.8 | 2 |
| | 19 | C17 | 8 | Branched | | 0 | 266 | 5 or less | 2 |
| | 20 | C18 | 8 | Branched | 2 | 3 | 464 | 10.1 | 2 |
| | 21 | C19 | 8 | Branched | 2 | 5 | 596 | 12.6 | 2 |
| | 22 | | Blend of C6 and C13 (1/1) | | | | | | 2 |
| | 23 | | Blend of C13 and C14 (1/1) | | | | | | 2 |
| | 24 | | Blend of C8 and C17 (1/1) | | | | | | 2 |
| | 25 | C6 | 7 | Branched | 2 | 1 | 311 | 5.5 | 2 |
| | 26 | C6 | 7 | Branched | 2 | 1 | 311 | 5.5 | 2 |
| | 27 | C6 | 7 | Branched | 2 | 1 | 311 | 5.5 | 2 |
| | 28 | C6 | 7 | Branched | 2 | 1 | 311 | 5.5 | 2 |
| | 29 | C6 | 7 | Branched | 2 | 1 | 311 | 5.5 | 2 |
| | 30 | C6 | 7 | Branched | 2 | 1 | 311 | 5.5 | 2 |
| | 31 | C6 | 7 | Branched | 2 | 1 | 311 | 5.5 | 1 |
| Comparative Examples | 1 | | | | | | | | |
| | 2 | Polyol A | | | | | 600 | | 2 |
| | 3 | Polyol B | | | | | 480 | | 2 |
| | 4 | C20 | 1 | Linear | 2 | 1 | 185 | 15 or more | 2 |
| | 5 | C21 | 21 | Linear | 2 | 7 | 1001 | 9.9 | 2 |

(Note 25) Polyol A (polyethylene glycol, solids content: 100%, hydroxy value: 187, number average molecular weight: about 600)

(Note 26) Polyol B (polyester polyol, solids content: 100%, hydroxy value: 235, number average molecular weight: about 480)

(Note 27) Crosslinking agent (D2): a blocked polyisocyanate compound, "Bayhydur VPLS2310," trade name, produced by Sumika Bayer Urethane Co., Ltd.; solids content: 38%

Method for Forming Coating Film (Production of Test Panel)

Test panels were produced in the following manner using each of the aqueous coating compositions (aqueous base coating compositions) (X1) to (X36) obtained in Examples 1 to 31 and Comparative Examples 1 to 5, and evaluation tests were conducted.

(Production of Test Substrate)

"ELECRON GT-10" (trade name, produced by Kansai Paint Co., Ltd.; a thermosetting epoxy resin cationic electrodeposition coating composition) was applied by electrodeposition to a cold-rolled steel plate treated with zinc phosphate to a dry film thickness of 20 μm, and cured by heating at 170° C. for 30 minutes. On the coating film, an intermediate coating composition "Amilac TP-65-2" (trade name, produced by Kansai Paint Co., Ltd., a polyester resin/amino resin organic solvent-based intermediate coating composition, coating color: gray) was applied to a dry film thickness of 35 m, and cured by heating at 140° C. for 30 minutes to prepare a test substrate.

Example 32

In a coating environment with a temperature of 23° C. and a humidity of 75%, the aqueous coating composition (aqueous base coating composition) (X1) obtained in Example 1 was applied to the test substrate using a rotary atomization bell-type electrostatic coating machine to a dry film thickness of 15 m, and allowed to stand for 2 minutes. Then, preheating was performed at 80° C. for 3 minutes. Subsequently, Magicron KINO-1210 (trade name, produced by Kansai Paint Co., Ltd.; an acrylic resin solvent-based top clear coating composition) was applied to the uncured coated surface to a dry film thickness of 35 m, and allowed to stand for 7 minutes. Then, both coating films were simultaneously cured by heating at 140° C. for 30 minutes, thereby producing a test panel.

Examples 33 to 62 and Comparative Examples 6 to 10

Test panels of Examples 33 to 62 and Comparative Examples 6 to 10 were each produced in the same manner as in Example 32, except that the aqueous coating composition (aqueous base coating composition) (X1) in Example 32 was changed to each of the aqueous coating compositions (aqueous base coating compositions) shown in Table 3 below.

Evaluation Test

The test panels obtained in Examples 32 to 62 and Comparative Examples 6 to 10 were each evaluated by the following test method. Table 3 below shows the evaluation results.

(Test Method)

Smoothness: Smoothness was evaluated based on the We values measured using "Wave Scan DOI" (trade name, produced by BYK Gardner Co.). The We value is an index of the amplitude of surface roughness at a wavelength of about 1 to 3 mm. A smaller measured value indicates a higher smoothness of the coated surface.

Distinctness of image: Distinctness of image was evaluated based on the Wb values measured using "Wave Scan DOI" (trade name, produced by BYK Gardner Co.). The Wb value is an index of the amplitude of surface roughness at a wavelength of about 0.3 to 1 mm. A smaller measured value indicates a higher distinctness of image of the coated surface.

Further, storability was evaluated in such a manner that test panels were produced in the same manner as described above using the coating compositions after storage, and the distinctness of image was evaluated.

The term "initial" in the table indicates the distinctness of image when the aqueous coating compositions (aqueous base coating compositions) were applied immediately after the production thereof, and the term "after storage" indicates the distinctness of image when the aqueous coating compositions (aqueous base coating compositions) were applied after they were stored at 30° C. for 30 days after the production thereof.

Metallic feel (IV value): The IV value was measured using ALCOPE LMR-100 (produced by Kansai Paint Co.,

TABLE 3

| | | Name of aqueous coating composition | Test results | | | | | |
|---|---|---|---|---|---|---|---|---|
| | | | Smoothness | Distinctness of image | | Metallic feel (IV value) | Metallic mottling | Water resistance |
| | | | | Initial | After storage | | | |
| Examples | 32 | X1 | 7.9 | 10.4 | 13.8 | 5 | A | A |
| | 33 | X2 | 8.2 | 9.5 | 12.3 | 5 | S | A |
| | 34 | X3 | 8.4 | 7.8 | 9.9 | 5 | A | S |
| | 35 | X4 | 8.9 | 6.9 | 8.8 | 5 | S | S |
| | 36 | X5 | 9.7 | 5.1 | 9.1 | 5 | S | S |
| | 37 | X6 | 9.6 | 4.6 | 6.1 | 5 | A | A |
| | 38 | X7 | 9.3 | 4.8 | 6.9 | 5 | S | S |
| | 39 | X8 | 9.9 | 5.5 | 9.6 | 5 | S | S |
| | 40 | X9 | 8.5 | 6.2 | 9.8 | 5 | S | S |
| | 41 | X10 | 8.6 | 5.7 | 7.2 | 5 | S | S |
| | 42 | X11 | 8.1 | 7.2 | 10.6 | 5 | A | S |
| | 43 | X12 | 7.8 | 6.7 | 10.1 | 5 | S | S |
| | 44 | X13 | 7.1 | 11.7 | 14.6 | 5 | A | A |
| | 45 | X14 | 7.3 | 13.8 | 15.2 | 5 | A | A |
| | 46 | X15 | 9.8 | 5.2 | 10.8 | 5 | A | A |
| | 47 | X16 | 9.2 | 4.9 | 10.1 | 5 | A | S |
| | 48 | X17 | 9.3 | 5.6 | 9.6 | 5 | A | A |
| | 49 | X18 | 6.2 | 7.1 | 9.2 | 5 | A | A |
| | 50 | X19 | 8.3 | 6.1 | 12.1 | 5 | A | A |
| | 51 | X20 | 7.9 | 6.4 | 10.9 | 5 | A | S |
| | 52 | X21 | 8.2 | 7.1 | 10.3 | 5 | A | A |
| | 53 | X22 | 8.3 | 5.0 | 8.9 | 5 | S | S |
| | 54 | X23 | 9.1 | 5.0 | 10.3 | 5 | A | S |
| | 55 | X24 | 8.0 | 5.8 | 10.4 | 5 | S | S |
| | 56 | X25 | 8.2 | 5.9 | 8.8 | 5 | A | S |
| | 57 | X26 | 7.6 | 8.8 | 10.9 | 5 | A | S |
| | 58 | X27 | 9.7 | 12.8 | 15.2 | 5 | A | A |
| | 59 | X28 | 9.2 | 6.2 | 8.3 | 5 | S | S |
| | 60 | X29 | 8.2 | 4.3 | 5.8 | 5 | S | A |
| | 61 | X30 | 7.3 | 4.1 | 8.9 | 5 | S | S |
| | 62 | X31 | 9.2 | 4.7 | 6.7 | 5 | A | A |
| Comparative Examples | 6 | X32 | 13.5 | 20.3 | 22.1 | 4 | C | A |
| | 7 | X33 | 12.8 | 23.3 | 24.8 | 4 | C | C |
| | 8 | X34 | 13.2 | 21.5 | 26.7 | 4 | C | C |
| | 9 | X35 | 13.4 | 18.3 | 25.1 | 4 | C | A |
| | 10 | X36 | 8.7 | 24.4 | 28.2 | 5 | C | B |

Ltd., surface shape measuring apparatus), and evaluated according to the following criteria.

The numerals shown in the table are as follows:
5: The IV value is 210 or more.
4: The IV value is 190 or more and less than 210.
3: The IV value is 170 or more and less than 190.
2: The IV value is 150 or more and less than 170.
1: The IV value is less than 140.

A larger numeral indicates superior metallic feel.

Metallic mottling: The test plates were each visually observed at different angles, and the coating appearance was evaluated according to the following criteria:
S: Almost no metallic mottling was observed, and the coating film had an extremely excellent appearance.
A: A small amount of metallic mottling was observed, but the coating film had an excellent appearance.
C: A considerable or significant amount of metallic mottling was observed, and the coating film had a poor appearance.

Water resistance: The test plates were immersed in warm water at 40° C. for 240 hours, removed, and dried at 20° C. for 12 hours. Subsequently, cross-cuts reaching the substrate were made in the multilayer coating film on each test plate using a cutter to form a grid of 100 squares (2 mm×2 mm). Afterwards, adhesive cellophane tape was applied to the surface of the grid portion and abruptly peeled off at 20° C. The number of the remaining coating film squares was then examined.
S: 100 squares remained, and no small edge chipping of the coating film occurred at the edge of the cut made with the cutter.
A: 100 squares remained, but small edge chipping of the coating film occurred at the edge of the cut made with the cutter.
B: 90 to 99 squares remained.
C: The number of remaining squares was 89 or less.

The invention claimed is:

1. An aqueous coating composition for vehicles, comprising:
(A) acrylic resin particles,
(B) a water-soluble acrylic resin, and
(C) a phosphoric acid compound represented by the following Formula (1):

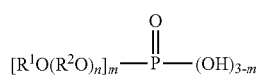

(1)

wherein m is 1 or 2, n is 0 or an integer of 1 to 20,
$R^1$ is substituted or unsubstituted hydrocarbon having 2 or more and 11 or less carbon atoms,
when m is 2, each $R^1$ may be the same or different,
$R^2$ is $C_{2-4}$ alkylene,
when n is 2 or more, n number of oxyalkylene units ($R^2O$) may be the same or different, and
when m is 2, each $(R^2O)_n$ may be the same or different.

2. The aqueous coating composition for vehicles according to claim 1, wherein the phosphoric acid compound (C) is a phosphoric acid compound represented by Formula (1) above, wherein n is an integer of 1 to 20.

3. The aqueous coating composition for vehicles according to claim 1, wherein the phosphoric acid compound (C) is a phosphoric acid compound represented by Formula (1) above, wherein the oxyalkylene unit ($R^2O$) is oxyethylene.

4. The aqueous coating composition for vehicles according to claim 1, wherein the phosphoric acid compound (C) is a phosphoric acid compound represented by Formula (1) above, wherein $R^1$ is substituted or unsubstituted hydrocarbon having 4 or more and 11 or less carbon atoms.

5. The aqueous coating composition for vehicles according to claim 4, wherein the phosphoric acid compound (C) is a phosphoric acid compound represented by Formula (1) above, wherein $R^1$ is substituted or unsubstituted hydrocarbon having 7 or more and 11 or less carbon atoms.

6. The aqueous coating composition for vehicles according to claim 1, wherein the phosphoric acid compound (C) is a phosphoric acid compound represented by Formula (1) above, wherein n is an integer of 1 to 20, and having an HLB value of 3 to 17.

7. The aqueous coating composition for vehicles according to claim 1, wherein the phosphoric acid compound (C) has a number average molecular weight of 100 to 3000.

8. The aqueous coating composition for vehicles according to claim 1, wherein the phosphoric acid compound (C) is a mixture of a phosphoric acid compound represented by Formula (1) above wherein n is 0, and a phosphoric acid compound represented by Formula (1) above wherein n is an integer of 1 to 20.

9. The aqueous coating composition for vehicles according to claim 1, further comprising a crosslinking agent (D).

10. The aqueous coating composition for vehicles according to claim 1, wherein the acrylic resin particles (A) are acrylic crosslinked resin particles.

11. A method for forming a coating film, the method comprising applying the aqueous coating composition for vehicles according to claim 1 to a substrate.

12. A method for forming a multilayer coating film, comprising:
applying an aqueous base coating composition (X) to a substrate to form a base coating film;
applying a clear coating composition (Y) to the uncured base coating film to form a clear coating film; and
simultaneously curing the uncured base coating film and the uncured clear coating film;
wherein the aqueous base coating composition (X) is the aqueous coating composition for vehicles according to claim 1.

13. An article coated with the aqueous coating composition for vehicles according to claim 1.

* * * * *